US008228412B2

(12) United States Patent
Hiratsuka

(10) Patent No.: US 8,228,412 B2
(45) Date of Patent: Jul. 24, 2012

(54) INFORMATION DISPLAY APPARATUS, IMAGE TAKING APPARATUS, AND METHOD AND COMPUTER PROGRAM FOR CONTROLLING DISPLAYING INFORMATION

(75) Inventor: Yosuke Hiratsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 1121 days.

(21) Appl. No.: 12/111,479

(22) Filed: Apr. 29, 2008

(65) Prior Publication Data

US 2008/0297638 A1 Dec. 4, 2008

(30) Foreign Application Priority Data

Jun. 4, 2007 (JP) ................. 2007-147729

(51) Int. Cl.
H04N 5/222 (2006.01)
G03B 13/02 (2006.01)
(52) U.S. Cl. ............... 348/333.02; 348/207.99; 396/374
(58) Field of Classification Search ........ 348/333.01–333.13; 396/374; 345/173
See application file for complete search history.

(56) References Cited

U.S. PATENT DOCUMENTS 7,561,201 B2 * 7/2009 Hong ................. 348/333.01
7,777,730 B2 * 8/2010 Geurts et al. ............ 345/173
2003/0092400 A1 * 5/2003 Shimabukuro ........... 455/90
2007/0063988 A1 * 3/2007 Suzuki et al. ........... 345/173
2007/0188647 A1 * 8/2007 Ikeda ................. 348/333.11
2007/0200945 A1 * 8/2007 Inukai ................ 348/333.02

FOREIGN PATENT DOCUMENTS

| JP | 2000-330181 | 11/2000 |
| JP | 2003-319226 | 11/2003 |
| JP | 2004-147135 | 5/2004 |
| JP | 2004-173029 | 6/2004 |
| JP | 2007-49371 | 2/2007 |

* cited by examiner

Primary Examiner — Ngoc-Yen Vu
(74) Attorney, Agent, or Firm — Oblon, Spivak, McClelland, Maier & Neustadt, L.L.P.

(57) ABSTRACT

An information display apparatus includes an input device adapted to input user operation information, a touch sensor adapted to detect the state of the input device in terms of whether the input device is touched by a user, a display adapted to display information, and a control unit adapted to receive user operation information from the input device and sensor detection information from the touch sensor, and control displaying of the information on the display in accordance with the received user operation information and the sensor detection information. If the touch information indicating that the input device is touched by the user is received from the touch sensor, the control unit displays first information associated with the input device on the display. If the input device is maintained in the touched state longer than a predetermined period, the control unit switches the displayed information into second information.

11 Claims, 14 Drawing Sheets

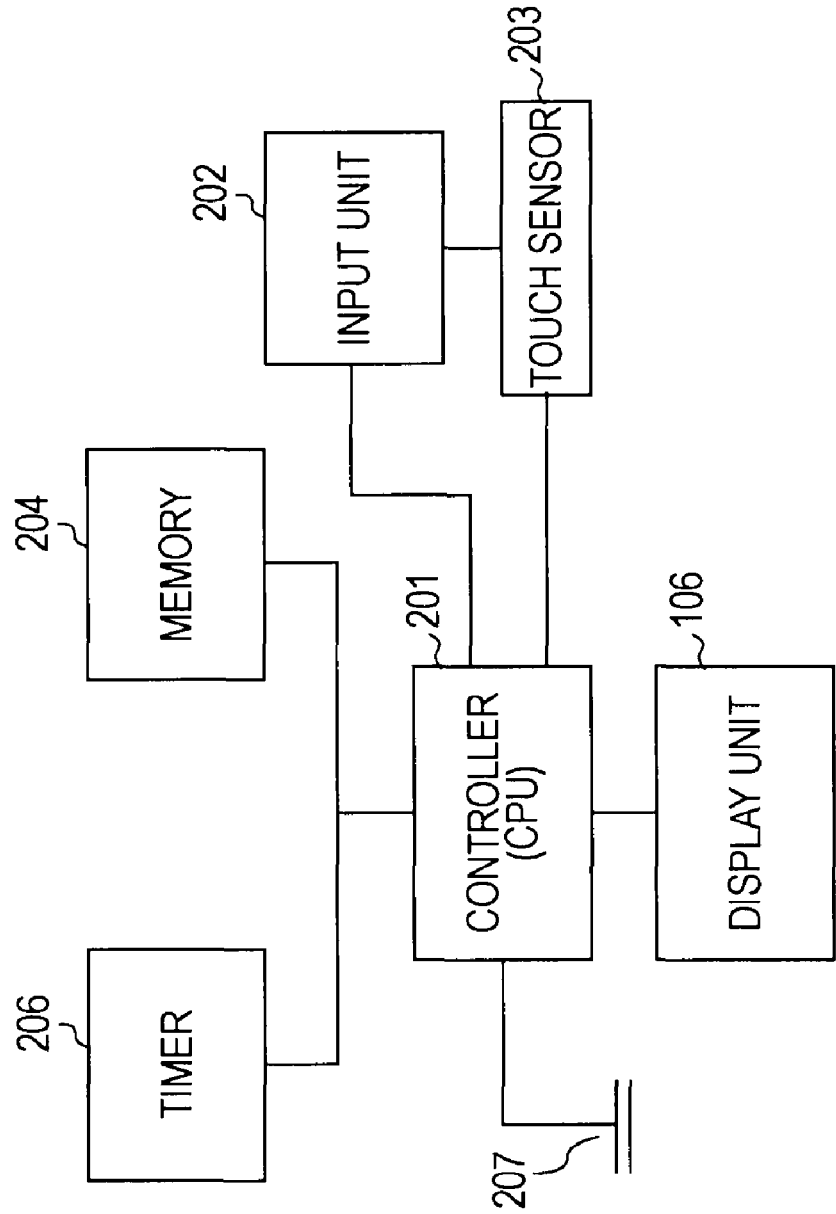

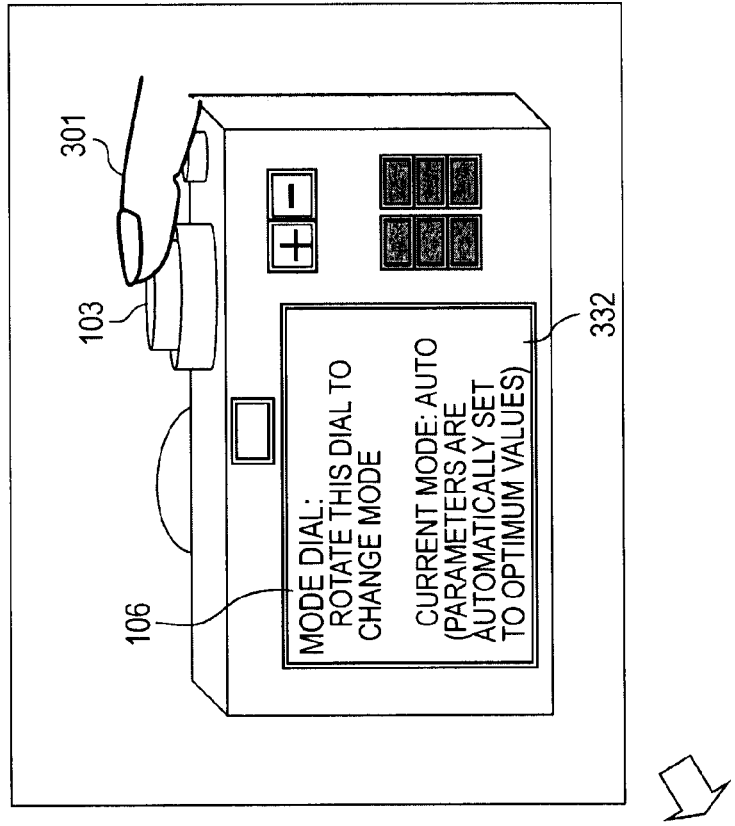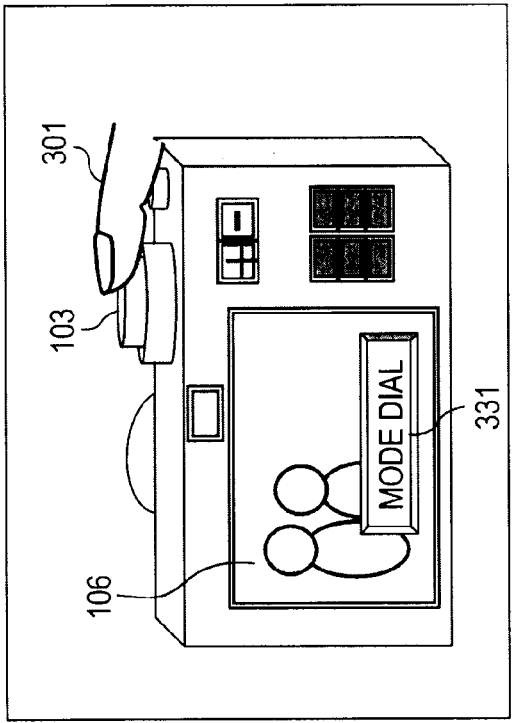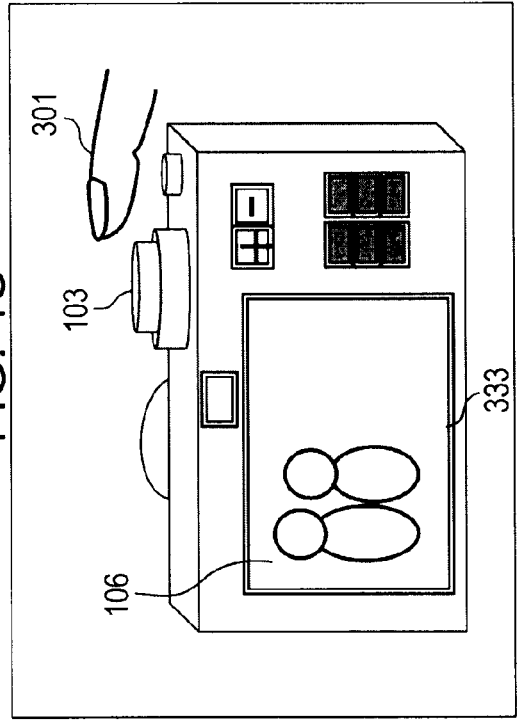

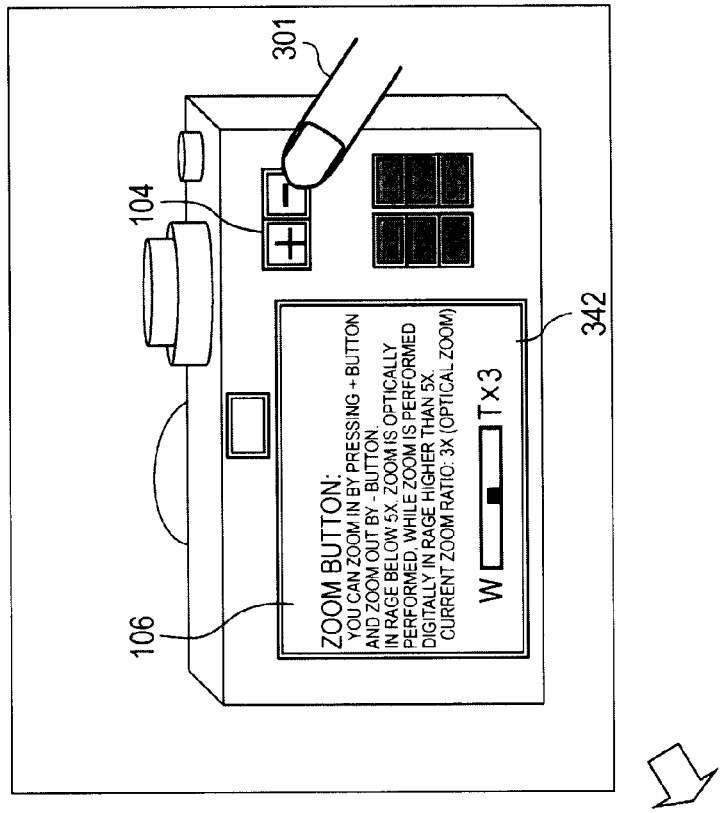
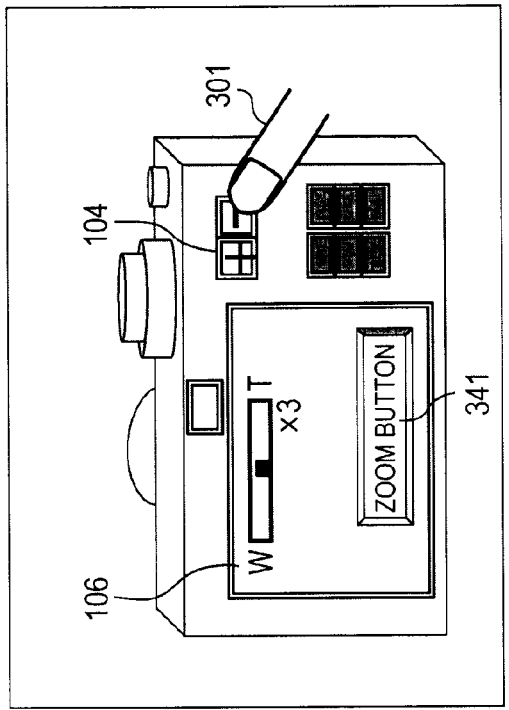
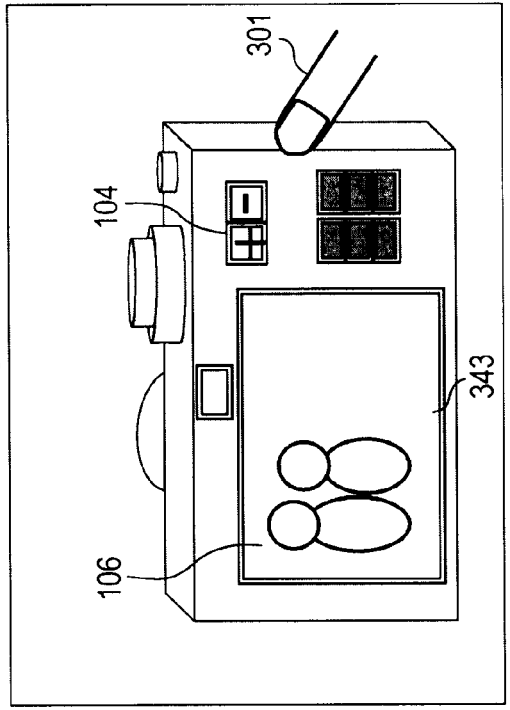

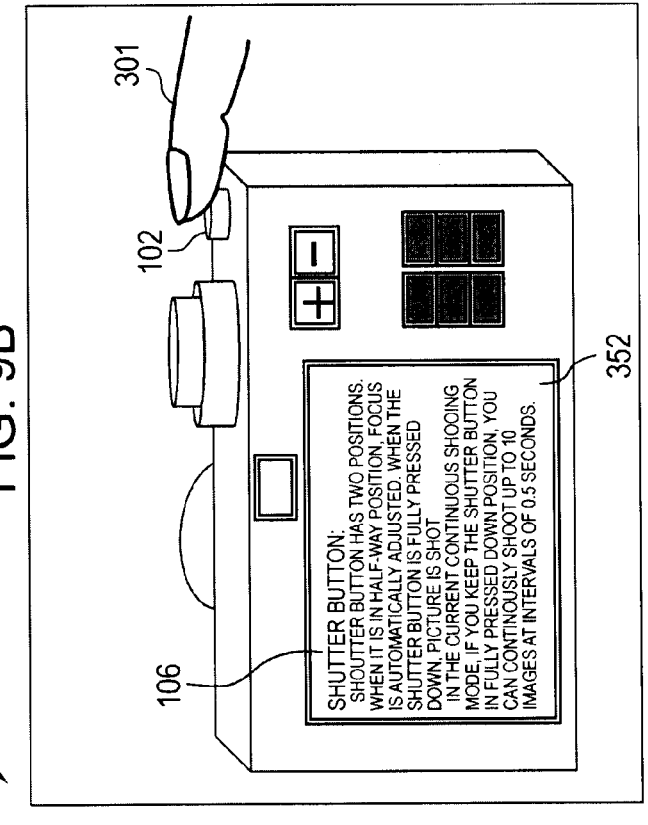
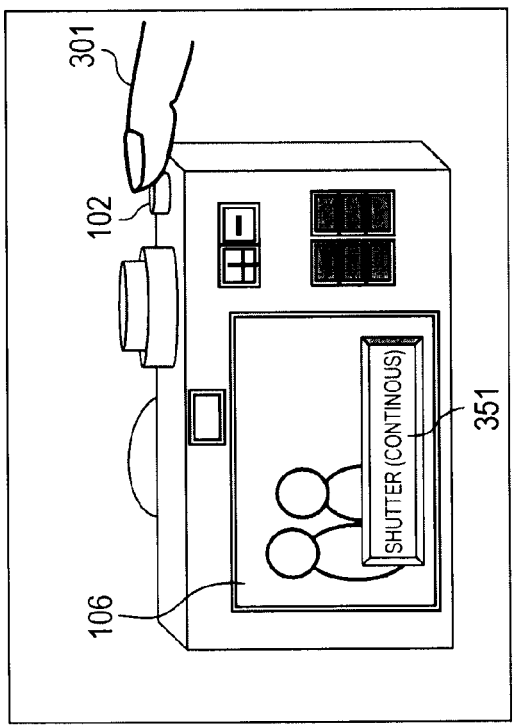
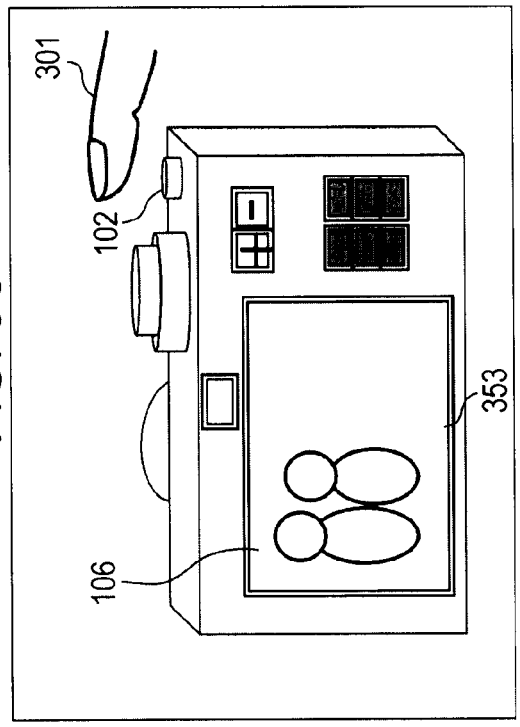

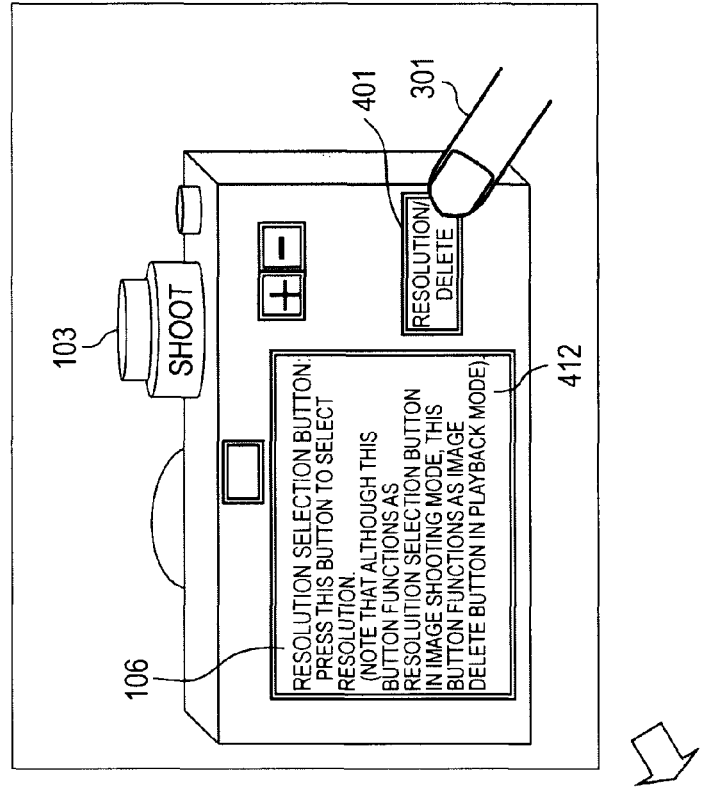
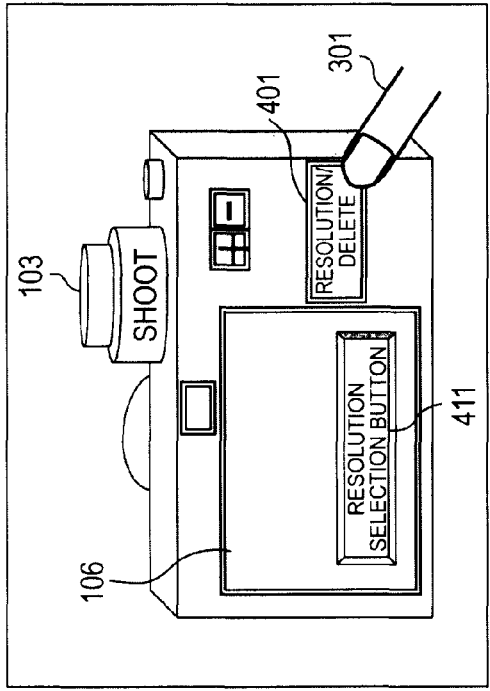
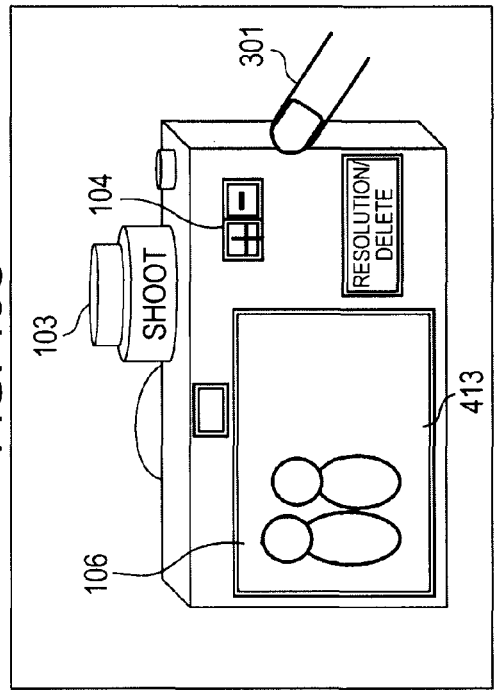

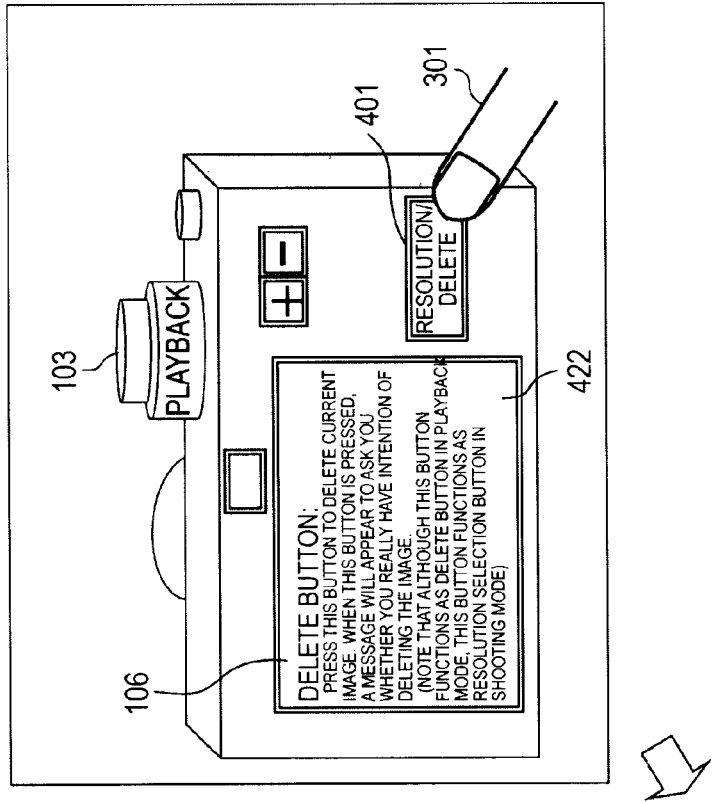
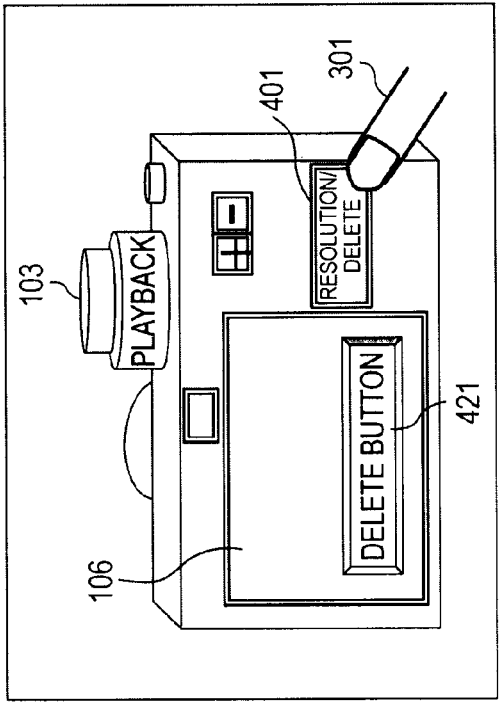
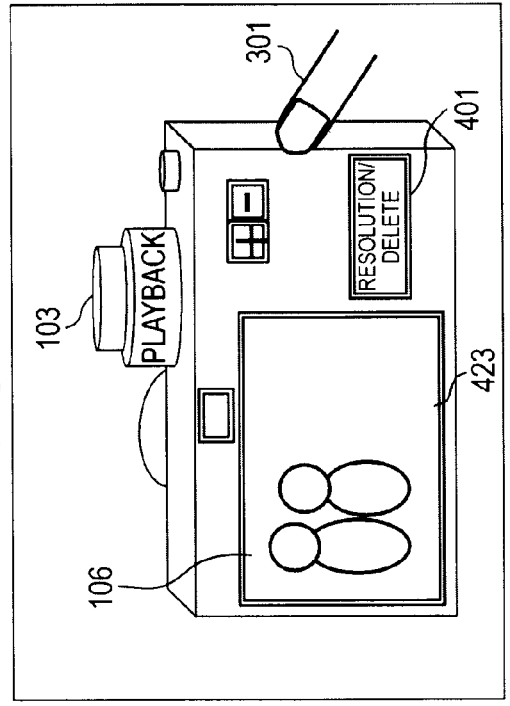

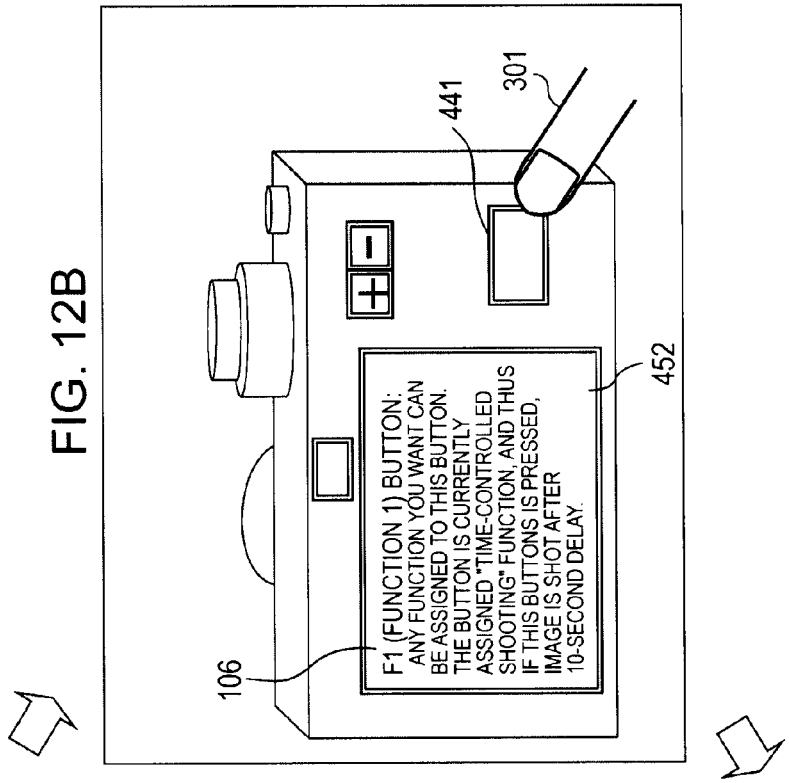
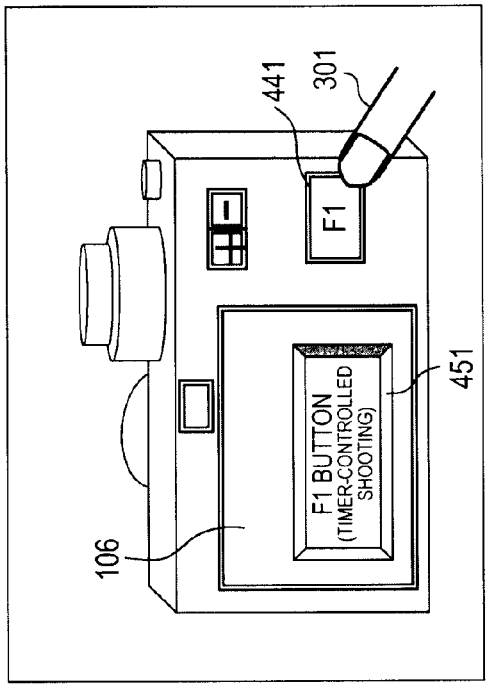
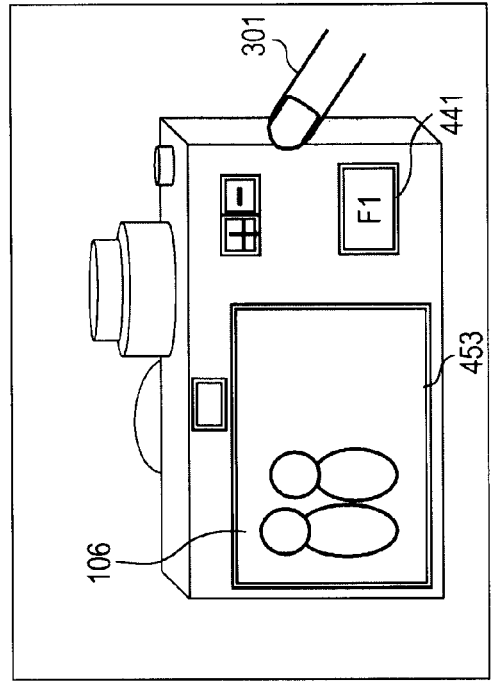

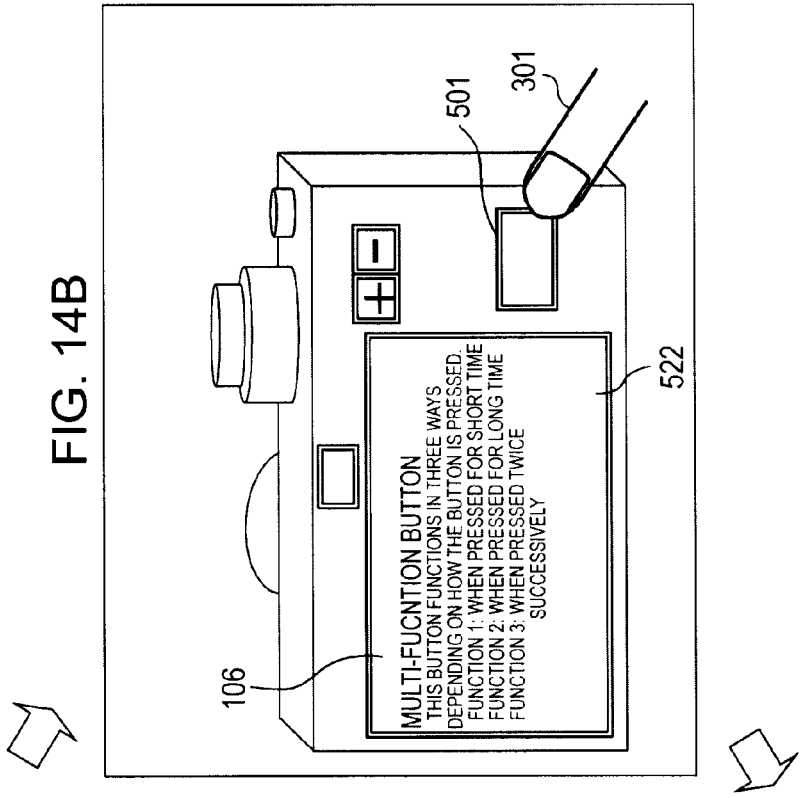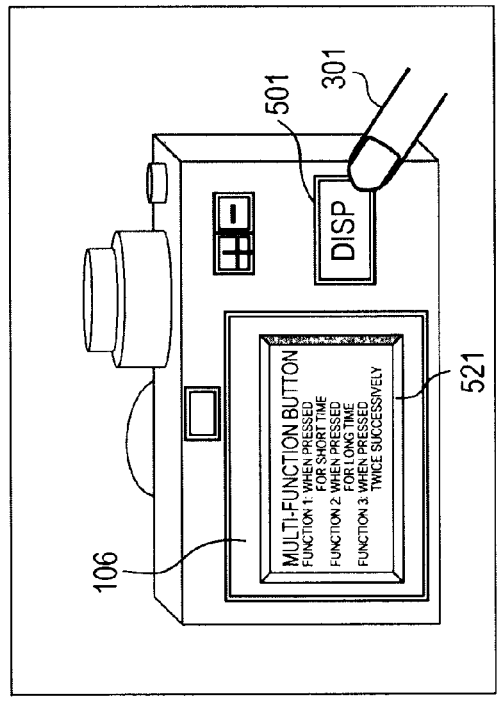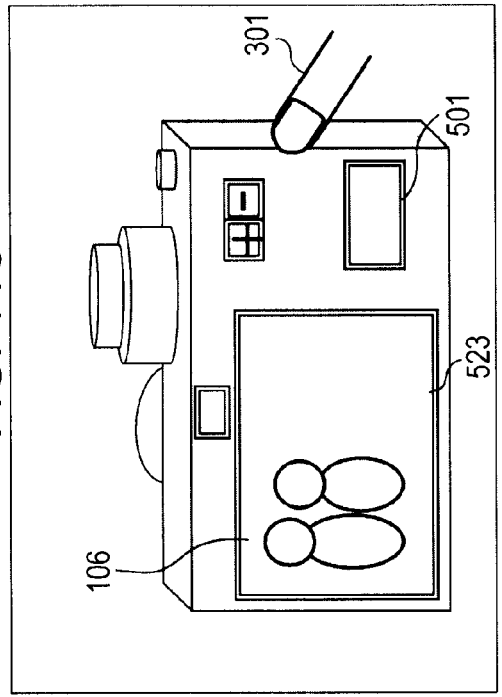

INFORMATION DISPLAY APPARATUS, IMAGE TAKING APPARATUS, AND METHOD AND COMPUTER PROGRAM FOR CONTROLLING DISPLAYING INFORMATION

CROSS REFERENCES TO RELATED APPLICATIONS

The present invention contains subject matter related to Japanese Patent Application JP 2007-147729 filed in the Japanese Patent Office on Jun. 4, 2007, the entire contents of which are incorporated herein by reference.

BACKGROUND OF THE INVENTION

1. Field of the Invention

The present invention relates to an information display apparatus, an image taking apparatus, and a method and computer program for controlling displaying information, and more particularly, to an information display apparatus, an image taking apparatus, and a method and computer program for controlling displaying information, in an apparatus such as a camera having a display, capable of controlling the timing of switching information displayed on the display depending on convenience of a user.

2. Description of the Related Art

In an image taking apparatus such as a digital still/video camera or in an information processing apparatus having a display, various processes are performed to display information on a display.

In some information processing apparatus such as a digital still camera having various input devices, a description of how to use input devices or a description of how the input devices function is displayed on the display as required. Specific examples of techniques to control displaying information may be found, for example, in Japanese Unexamined Patent Application Publication No. 2000-330181, Japanese Unexamined Patent Application Publication No. 2003-319226, or Japanese Unexamined Patent Application Publication No. 2004-173029.

In the technique disclosed in Japanese Unexamined Patent Application Publication No. 2000-330181, when a particular input device is operated by a user, a function of the input device is displayed on a display. In the technique disclosed in Japanese Unexamined Patent Application Publication No. 2003-319226, when a help button is pressed, information indicating an operation performed previously and a related description are displayed. In Japanese Unexamined Patent Application Publication No. 2004-173029, disclosed is a digital camera having an instruction mode in which various descriptions are provided.

However, in the technique disclosed in Japanese Unexamined Patent Application Publication No. 2000-330181 and the technique disclosed in the Japanese Unexamined Patent Application Publication No. 2003-319226, the description of the function of the input device is displayed only for a fixed period after the input device is operated by a user. In the technique disclosed in Japanese Unexamined Patent Application Publication No. 2004-173029, the description of the function of the input device is displayed only when the operation mode is set in the instruction mode.

SUMMARY OF THE INVENTION

In view of the above, in an information display apparatus, an image taking apparatus, and a method and computer program for controlling displaying information, it is desirable to provide a technique to display information on a display of a camera or the like such that when a user-operable input device is touched by a user, information indicating how to use the input device or how the input device functions is displayed in various forms different in detail level depending on a manner in which the input device is touched thereby to provide optimum information needed by a user.

According to an embodiment of the present invention, there is provided an information display apparatus including an input device adapted to input user operation information, a touch sensor adapted to detect the state of the input device in terms of whether the input device is touched by a user, a display adapted to display information, and a control unit adapted to receive user operation information from the input device and sensor detection information from the touch sensor, and control displaying of the information on the display in accordance with the received user operation information and the sensor detection information, the control unit controlling the displaying of the information such that if the touch information indicating that the input device is touched by the user is received from the touch sensor, the control unit displays first information associated with the input device on the display, and if the input device is then maintained in the touched state over a period equal to or greater than a predetermined maximum display period assigned to the first information, the control unit switches the information displayed on the display into information including at least second information.

In this information display apparatus, the control unit may further control the displaying of the information such that if information indicating that the input device is not touched by the user is received from the touch sensor during the execution of displaying the first information or the second information associated with the input device, the control unit stops the displaying first information or the second information.

In the information display apparatus, the first information or the second information may include at least operation information, function information, or setting information associated with the input device.

In the information display apparatus, the input device may be an input device whose function changes depending on a mode in which an operation mode is currently set, and the control unit may control the displaying of information such that when the first information or the second information is displayed, the control unit displays information associated with the input device depending on the current operation mode.

In the information display apparatus, the input device may be a function input device adapted to be set so as to have a function selected by a user, and the control unit may control the displaying of the information such that when the first information or the second information is displayed, the control unit displays information associated with the function input device depending on the function currently set.

In the information display apparatus, the input device may be a multi-function input device whose function is assigned depending on the number of times the multi-function input device is operated or depending on a manner in which the multi-function input device is operated, and the control unit may control the displaying of the information such that when the first information or the second information is displayed, the control unit displays information associated with the currently assigned function of the multi-function input device.

In the information display apparatus, the first information may be brief explanatory information associated with the input device, and the second information may be detailed explanatory information associated with the input device.

According to an embodiment of the present invention, there is provided an image taking apparatus including imaging means for producing an image of a subject, an input device adapted to input user operation information, a touch sensor adapted to detect the state of the input device in terms of whether the input device is touched by a user, a display adapted to display information, and a control unit adapted to receive user operation information from the input device and sensor detection information from the touch sensor, and control displaying of the information on the display in accordance with the received user operation information and the sensor detection information, the control unit controlling the displaying of the information such that if the touch information indicating that the input device is touched by the user is received from the touch sensor, the control unit displays first information associated with the input device on the display, and if the input device is then maintained in the touched state over a period equal to or greater than a predetermined maximum display period assigned to the first information, the control unit switches the information displayed on the display into information including at least second information.

In this image taking apparatus, the control unit may control the displaying of the information such that if information indicating that the input device is not touched by the user is received from the touch sensor during the execution of displaying the first information or the second information associated with the input device, the control unit stops the displaying first information or the second information.

In the image taking apparatus, the first information or the second information may include at least operation information, function information, or setting information associated with the input device.

In the image taking apparatus, the first information may be brief explanatory information associated with the input device, and the second information may be detailed explanatory information associated with the input device.

According to an embodiment of the present invention, there is provided a method of controlling displaying information, executed in an information display apparatus, including the steps of by a control unit, inputting sensor detection information from a touch sensor associated with an input device, and by the control unit, controlling displaying the information such that if the control unit receives touch information indicating that the input device is touched by a user from the touch sensor, the control unit displays first information associated with the input unit on a display, and if the control unit determines that the input device is then maintained in the touched state over a period equal to or greater than a predetermined maximum display period assigned to the first information, the control unit switches the information displayed on the display into information including at least second information.

In this method, the step of controlling displaying the information may further include the step of stopping the displaying first information or the second information if information indicating that the input device is not touched by the user is received from the touch sensor during the execution of displaying the first information or the second information associated with the input device.

In this method, the first information or the second information may include at least operation information, function information, or setting information associated with the input device.

In this method, the first information may be brief explanatory information associated with the input device, and the second information may be detailed explanatory information associated with the input device.

According to an embodiment of the present invention, there is provided a computer program executable by a computer to perform a process of controlling displaying information in an information display apparatus, including the steps of controlling a control unit to input sensor detection information from a touch sensor associated with an input device, and controlling the control unit to control displaying the information such that if the control unit receives touch information indicating that the input device is touched by a user from the touch sensor, the control unit displays first information associated with the input unit on a display, and if the control unit determines that the input device is then maintained in the touched state over a period equal to or greater than a predetermined maximum display period assigned to the first information, the control unit switches the information displayed on the display into information including at least second information.

The computer program may be provided to a computer system capable of executing various computer program codes via a storage medium on which the program is stored in a computer-readable manner or via a communication medium. By providing the program in the computer-readable form as described above, it becomes possible to execute processes on the computer system in accordance with the program.

These and other objects and features of the present invention will become more apparent from the following detailed description of embodiments with reference to the accompanying drawings. In the present description, the term "system" is used to describe a logical collection of a plurality of devices, and it is not necessarily required that the plurality of devices be disposed in a single case.

As described above, the present invention provides a great advantage. That is, if the control unit of the information display apparatus receives the touch information indicating that the input device is touched by the user from the touch sensor associated with the input device, the control unit displays brief explanatory information associated with the input device on the display. If the control unit determines that this input device has been maintained in the touched state for a period equal to or longer than a maximum display period assigned to the brief information, the control unit switches the displayed information into detailed explanatory information thereby to provide more detailed information to a user so that the user can understand how to use the input device or how the input device functions.

BRIEF DESCRIPTION OF THE DRAWINGS

FIG. 2 is a diagram illustrating an example of a hardware configuration of an information display apparatus according to an embodiment of the present invention;

FIGS. 4A to 4C are diagrams illustrating an example of a manner in which information displayed on a display of an information display apparatus is switched according to an embodiment of the present invention;

FIGS. 8A to 8C are diagrams illustrating an example of a manner in which information displayed on a display of an information display apparatus is switched according to an embodiment of the present invention;

FIGS. 9A to 9C are diagrams illustrating an example of a manner in which information displayed on a display of an information display apparatus is switched according to an embodiment of the present invention;

FIGS. 10A to 10C are diagrams illustrating an example of a manner in which information displayed on a display of an information display apparatus is switched according to an embodiment of the present invention;

FIGS. 11A to 11C are diagrams illustrating an example of a manner in which information displayed on a display of an information display apparatus is switched according to an embodiment of the present invention;

FIGS. 12A to 12C are diagrams illustrating an example of a manner in which information displayed on a display of an information display apparatus is switched according to an embodiment of the present invention;

FIGS. 14A to 14C are diagrams illustrating an example of a manner in which information displayed on a display of an information display apparatus is switched according to an embodiment of the present invention.

DESCRIPTION OF THE PREFERRED EMBODIMENTS

Referring to the accompanying drawings, an information display apparatus, an image taking apparatus, a method and computer program for controlling displaying information according to embodiments of the present invention are described in detail below. In the following explanation, by way of example, an embodiment of an image taking apparatus according to the present invention is described.

Figure 1B:
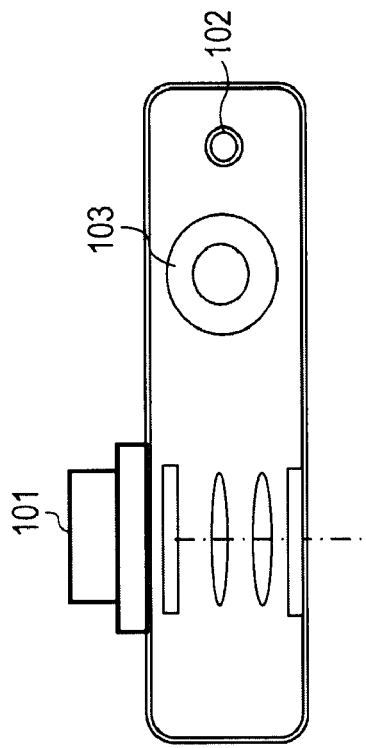
FIGS. 1A to 1C illustrate an example of a structure of an image taking apparatus according to an embodiment of the present invention.
Figure 1C:
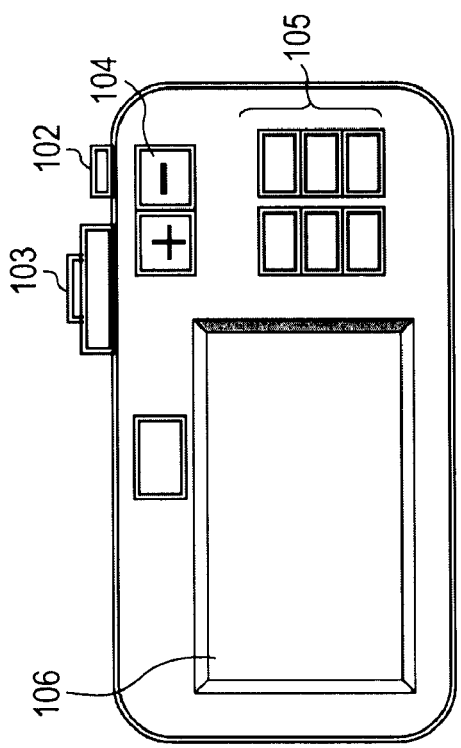
Figure 1A:
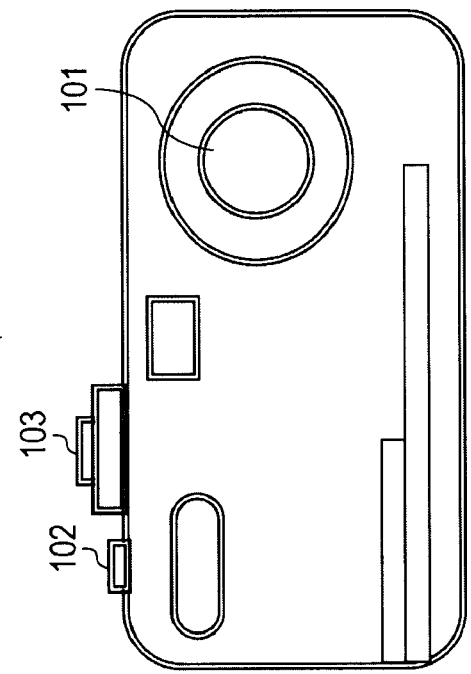

First, referring to FIGS. 1A to 1C and FIG. 2, an example of an external structure and an example of a hardware configuration of the image taking apparatus are described. FIGS. 1A to 1C illustrate the external structure of the image taking apparatus 100. More specifically, FIG. 1A illustrates a front view of the image taking apparatus 100, FIG. 1B illustrates a top view, and FIG. 1C illustrates a rear view. Note that in FIG. 1B, a lens system is shown in the form of a cross-sectional view. The image taking apparatus 100 includes a lens unit 101, a shutter button 102, a mode selection dial 103 for setting a mode to a shoot mode, a playback mode, or the like, a zoom button 104 for setting a zoom parameter, an operation button 105 for making various settings and operations, and a display (monitor) 106 adapted to display an image (through-image) taken by the image taking apparatus and also various kinds of information such as operation information.

An image of a subject is displayed on the display (monitor) 106. More specifically, the display 106 is configured, for example, using a LCD such that a subject image captured via a lens is displayed thereon in the form of a moving image. This moving image is called a through-image. The display 106 is also used to display a still image taken by the image taking apparatus. Furthermore, the display 106 is used to display various kinds of information such as shooting parameters and descriptions or instructions on operations.

Next, referring to FIG. 2, major hardware parts of the image taking apparatus according to the embodiment of the present invention are described below. FIG. 2 is a block diagram illustrating main hardware parts of the image taking apparatus. The image taking apparatus includes a control unit (CPU) 201, an input unit 202 (including input devices such as the shutter button 102, the mode selection dial 103, the zoom button 104, and the operation button 105, shown in FIG. 1), touch sensors 203, a memory 204, a display 106, a timer 206, and a power supply 207. The display 106 shown in FIG. 2 corresponds to the display 106 shown in FIG. 1C.

The control unit 201 is configured to control data processing in the image taking apparatus in accordance with operation information supplied from the input unit 202 or the touch sensors 203. More specifically, processes controlled by the control unit 201 includes, for example, starting of an image taking process, signal processing of image data, storing of image data in the memory 204, and displaying various kinds of information on the display 106 depending on an operation performed by a user. The memory 204 is used not only as a storage area of image data but also as a storage area of a program executed by the control unit 201, and a work area used by the control unit 201 during the execution of the program. The memory 204 may be a combination of various types of memories such as a RAM, a ROM, and other storage media, although the memory 204 shown in FIG. 2 has a simple form.

The touch sensors 203 include a plurality of touch sensors adapted to separately sense the status of respective input devices 202 shown in FIG. 1, such as the shutter button 102, the mode selection dial 103, the zoom button 104, and the operation button 105. The touch sensors 203 detect whether a finger of a user is contact with the shutter button 102, the mode selection dial 103, the zoom button 104, or the operation button 105, and the touch sensors 203 output detection information indicating the contact status of each input device 202 to the control unit 201.

If the control unit 201 receives various kinds of operation information from the input unit 202 including the input devices shown in FIG. 1 such as the shutter button 102, the mode selection dial 103, the zoom button 104, and the operation button 105 and time information from the timer 206, the control unit 201 performs a process depending on an operation indicated by the operation information, such as a shooting process, controlling displaying information on the display 106, etc., in accordance with the detection information output from the touch sensors 203 associated with the respective input devices 202 shown in FIG. 1 such as the shutter button 102, the mode selection dial 103, the zoom button 104, and the operation button 105.

Figure 3:
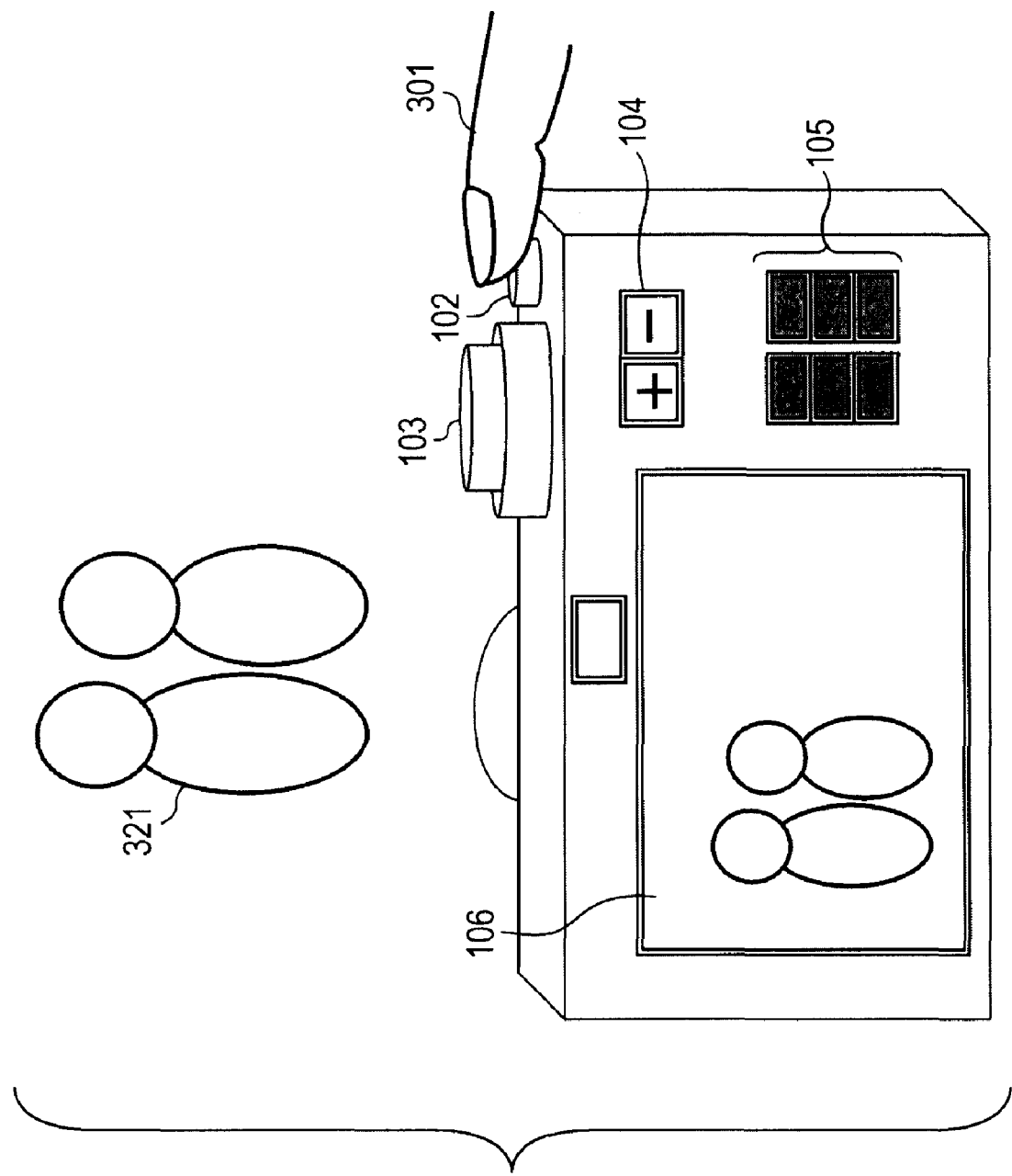
FIG. 3 is a diagram illustrating an example of information displayed on a display of an information display apparatus according to an embodiment of the present invention.

Next, referring to FIG. 3 and other figures, the process performed by the control unit 201 to control displaying information is described in further detail below. FIG. 3 illustrates a manner in which an image of a subject is taken by a user. To take an image of a subject 321, a user 301 presses the shutter button 102 of a camera. Before the shutter button 102 is pressed, a through-image (motion image) of the subject is displayed on the display 106 of the camera so that the user can determine the composition on the basis of the displayed through-image. After the composition is determined, if the user presses the shutter button 102, an image of the subject is taken.

As described above with reference to FIG. 1, the image taking apparatus 100 has the input unit including various user-operable input devices shown in FIG. 1 such as the shutter button 102, the mode selection dial 103, the zoom button 104, and the operation button 105. A user does not necessarily know functions of all these input devices, and thus it is desirable to provide a description of the functions of the input devices and/or information indicating the modes currently set for the input devices, as required.

In the image taking apparatus according to the present embodiment of the invention, as described above with reference to FIG. 2, the touch sensors 203 are disposed for respective input devices of the input unit 202, and touch detection information output from the touch sensor 203 associated with each input device 202 is supplied to the control unit 201. In accordance with the received touch detection information, the control unit 201 displays information indicating the function and/or the mode of the input device on the display 106. More specifically, the control unit 201 switches the information displayed on the display 106 in accordance with the detection information which is output from the touch sensor 203 to indicate whether a finger of a user is in contact with a input device 202, as described above with reference to FIG. 2.

In the present embodiment, the control of displaying of information is performed such that information displayed on the display 106 is switched among a plurality of pieces of information (first to n-th information). For example, if the control unit 201 detects that touch information supplied from a particular touch sensor indicates that a corresponding particular input device is touched by a user, the control unit 201 displays first information associated with this input device. If the control unit 201 determines that this input device has been maintained in the touched state for a period equal to or longer than a maximum display period assigned to the first information, the control unit 201 switches the information displayed on the display 106 to the second information associated with the input device. In the following explanation, by way of example, it is assumed that the first information is brief information of the input device and the second information is detailed information thereof.

FIGS. 4A to 4C illustrate an example of a manner in which displayed information is switched in accordance with the present embodiment of the invention. In the example shown in FIGS. 4A to 4C, information displayed on the display 106 is switched in response to an operation performed by a user on the mode selection dial 103 to select an operation mode from a group including a shoot mode, a playback mode, etc.

In the example shown in FIG. 4A, brief information is displayed on the display 106 when a user touches the mode selection dial 103 with a user's finger 301 at a time T0 and the brief information is continuously displayed for a following period in which the mode selection dial 103 is maintained in the touched state, unless the period does not exceed a maximum display period Ta assigned to the brief information. More specifically, over this period, the control unit 201 displays brief explanatory information 331 on the display 106 as first-level explanatory information of the input device 202 touched by the user, i.e., the mode selection dial 103 in this specific case. In the example shown in FIG. 4A, only a name "MODE DIAL" of the touched input device is displayed as the brief explanatory information 331. If the control unit 201 detects that the finger of the user is brought into contact with the mode selection dial 103 and thus the detection information supplied from the touch sensor changes into an ON level, the control unit 201 displays the brief explanatory information 331 and maintains it over a following period during which the detection information output from the touch sensor is at the ON level, unless the period does not exceed the maximum display period (Ta) assigned to thee brief information.

FIG. 4B illustrates an example of information which is displayed on the display 106 in a following period after the expiration of the maximum display period (Ta) assigned to the brief information in a case where the finger 301 of the user is still maintained in contact with the mode selection dial 103. More specifically, in this period after the expiration of the maximum display period Ta assigned to the brief information, the control unit 201 displays detailed explanatory information 332 on the display 106 as second-level information about the input device 202 being touched by the user, i.e., the mode selection dial 103 in this specific case. In the example shown in FIG. 4B, the detailed explanatory information 332 includes a description of the function of the mode selection dial and a current operation mode. That is, when a predetermined period has elapsed since the finger of the user was put on the mode selection dial 103 and thus the detection information output from the touch sensor turned on, if the user's finger is still in contact with the mode selection dial 103, then the control unit 201 switches the displayed information from the brief explanatory information 331 to the detailed explanatory information 332.

FIG. 4C illustrates an example of information which is displayed when the finger 301 of the user is moved away from the mode selection dial 103 and thus the mode selection dial 103 returns into the non-touched state. More specifically, if the control unit 201 detects that the finger of the user has moved away from the mode selection dial 103 and thus the detection information output from the touch sensor has changed into the OFF state, the control unit 201 changes the information displayed on the display 106, for example, into a through-image as shown in FIG. 4C.

In the present embodiment, as described above, the displayed information is switched in accordance with the touch information indicating the contact status of the input device. If the input device is maintained in the touched state, the displayed information is switched into a more detailed version thereby to provide information to a user depending on whether the user needs the detailed information. The brief explanatory information and the detailed explanatory information displayed on the display include at least one of operation information, function information, or setting information, associated with the input device.

Figure 5:
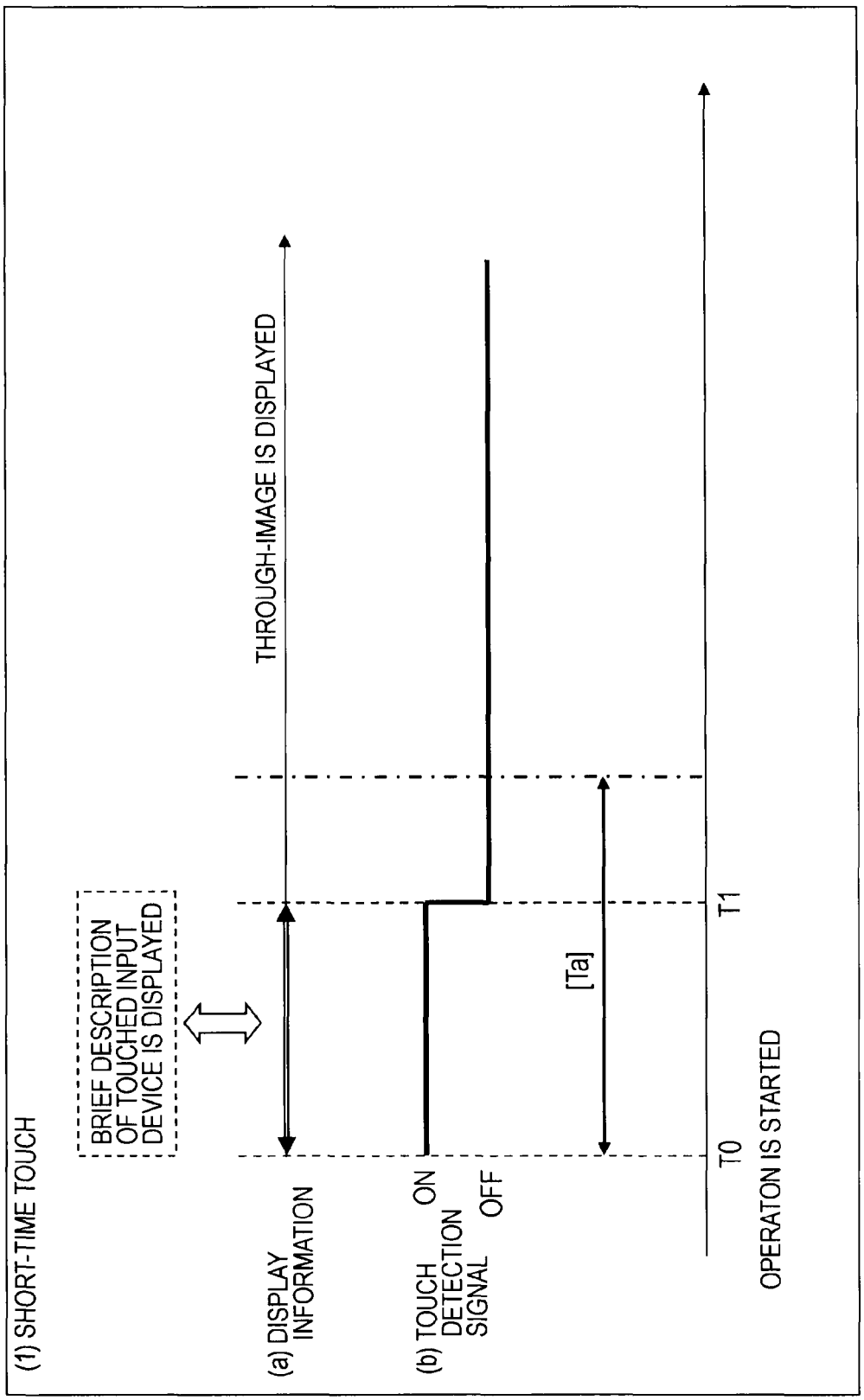
FIG. 5 is a diagram illustrating an example of a process of switching information displayed on a display of an information display apparatus according to an embodiment of the present invention.

Specific examples of the display control process according to the present embodiment are described below with reference to FIGS. 5 and 6. FIG. 5 illustrates an example of a display control process for a case where the input device is released from a contact state into a non-contact state after a short period during which the input device is maintained in the contact state. In FIG. 5, displayed information (a) and touch information detection signal (b) displayed or detected in this case are shown. In a period during which a user maintains his/her finger in contact with the input device 202 (for example, the mode selection dial 103), the touch information detection signal (b) is in the ON state. During this period, a state detection signal with an ON level is supplied from the touch sensor 203 to the control unit 201 to notify that the finger of the user is in contact with the input device 202. More specifically, when it is detected that the user brings his/her finger into contact with the input device 202 at a time T0, brief explanatory information associated with the input device touched by the user is displayed on the display 106 and is kept displayed over a following period in which the input device is in the touched state, unless the period does not exceed the maximum display period (Ta). If the user moves his/her finger away from the input device 202 (for example, the mode selection dial 103), the touch information detection signal (b) changes into the OFF level, and thus the control unit 201 switches the information displayed on the display 106 from the brief explanatory information into another piece of information such as a through-image.

In the example shown in FIG. 5, the period (from T0 to T1) during which the input device 202 (for example, the mode selection dial 103) is in the touched state is shorter than the predetermined maximum display period (Ta) assigned to the brief information, and thus the information displayed on the display 106 is not switched from the brief explanatory information to the detailed explanatory information but switched from the brief explanatory information to the through-image.

Figure 6:
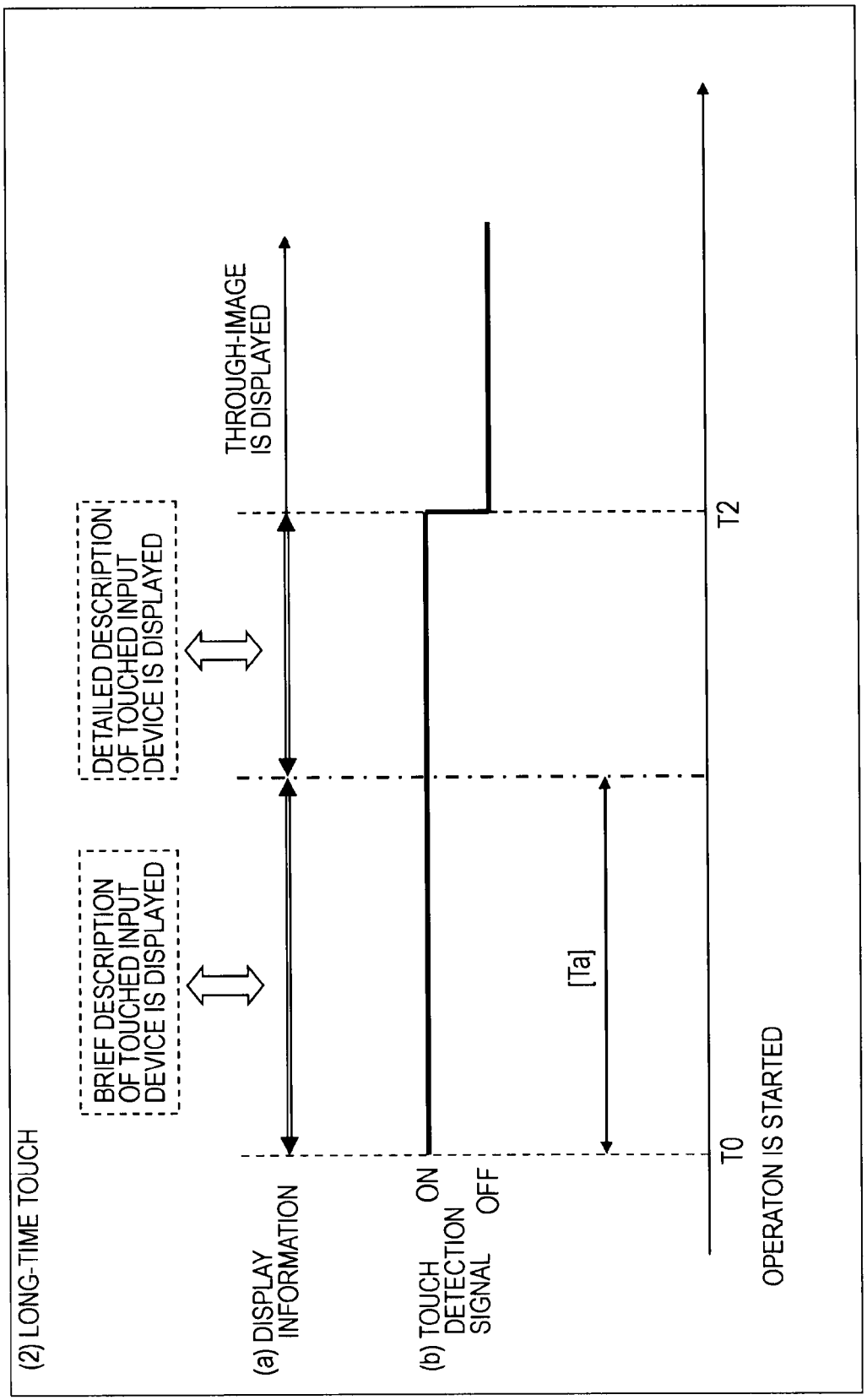
FIG. 6 is a diagram illustrating an example of a process of switching information displayed on a display of an information display apparatus according to an embodiment of the present invention.

Next, referring to FIG. 6, explained is an example of a display control process performed for a case where an input device 202 (for example, the mode selection dial 103) is maintained in the touched state over a period longer than the predetermined maximum display period (Ta) assigned to the brief information.

FIG. 6 illustrates an example of a display control process for a case where an input device is maintained in the touched state for a long period. In FIG. 6, displayed information (a) and touch information detection signal (b) displayed or detected in this case are shown. In a period during which a user maintains his/her finger in contact with the input device 202 (for example, the mode selection dial 103), the touch information detection signal (b) is in the ON state. During this period, a state detection signal with an ON level is supplied from the touch sensor 203 to the control unit 201 to notify that the finger of the user is in contact with the input device 202. More specifically, when it is detected that the user brings his/her finger into contact with the input device 202 at a time T0, brief explanatory information associated with the input device touched by the user is displayed on the display 106 and is kept displayed over a following period in which the input device is in the touched state, unless the period does not exceed the maximum display period (Ta).

In the present example, the input device 202 (for example, the mode selection dial 103) is maintained in the touched state over a period (from T0 to T2) longer than the maximum display period (Ta) assigned to the brief information. In this case, when the period Ta has elapsed since the time T0, the control unit switches the information displayed on the display from the brief explanatory information to the detailed explanatory information. In this specific example, the information displayed as shown in FIG. 4A is switched to information shown in FIG. 4B. Thus, the user is provided with more detailed information about the input device with which the user keeps his/her finger in contact.

If the user moves his/her finger away from the input device at a time T2, the touch information detection signal (b) changes into the OFF level, and thus the control unit 201 switches the information displayed on the display 106 from the detailed explanatory information into another piece of information such as a through-image.

In the present embodiment of the invention, as described above, the control unit 201 of the image taking apparatus monitors the status of each input device in terms of whether it is touched by a user on the basis of the touch information supplied from the touch sensor 203. If a change of the touch information into the ON state is detected, the control unit 201 displays, on the display, brief explanatory information associated with the touched input device. If the input device is maintained in the touched state longer than the predetermined maximum display period (Ta) assigned to the brief information, the control unit 201 switches the displayed information from the brief explanatory information to the detailed explanatory information at a time at which the maximum display period (Ta) expires. If the user moves his/her finger away from the input device, the control unit 201 deletes the brief explanatory information or the detailed explanatory information and displays another piece of information such as a through-image on the display.

In a case where the user operates an input device, for example, the mode selection dial 103 to switch the operation mode, the control unit 201 displays information associated with the new operation mode. If the user further touches another input device, the control unit 201 displays explanatory information (brief explanatory information) associated with the touched input device.

Figure 7:
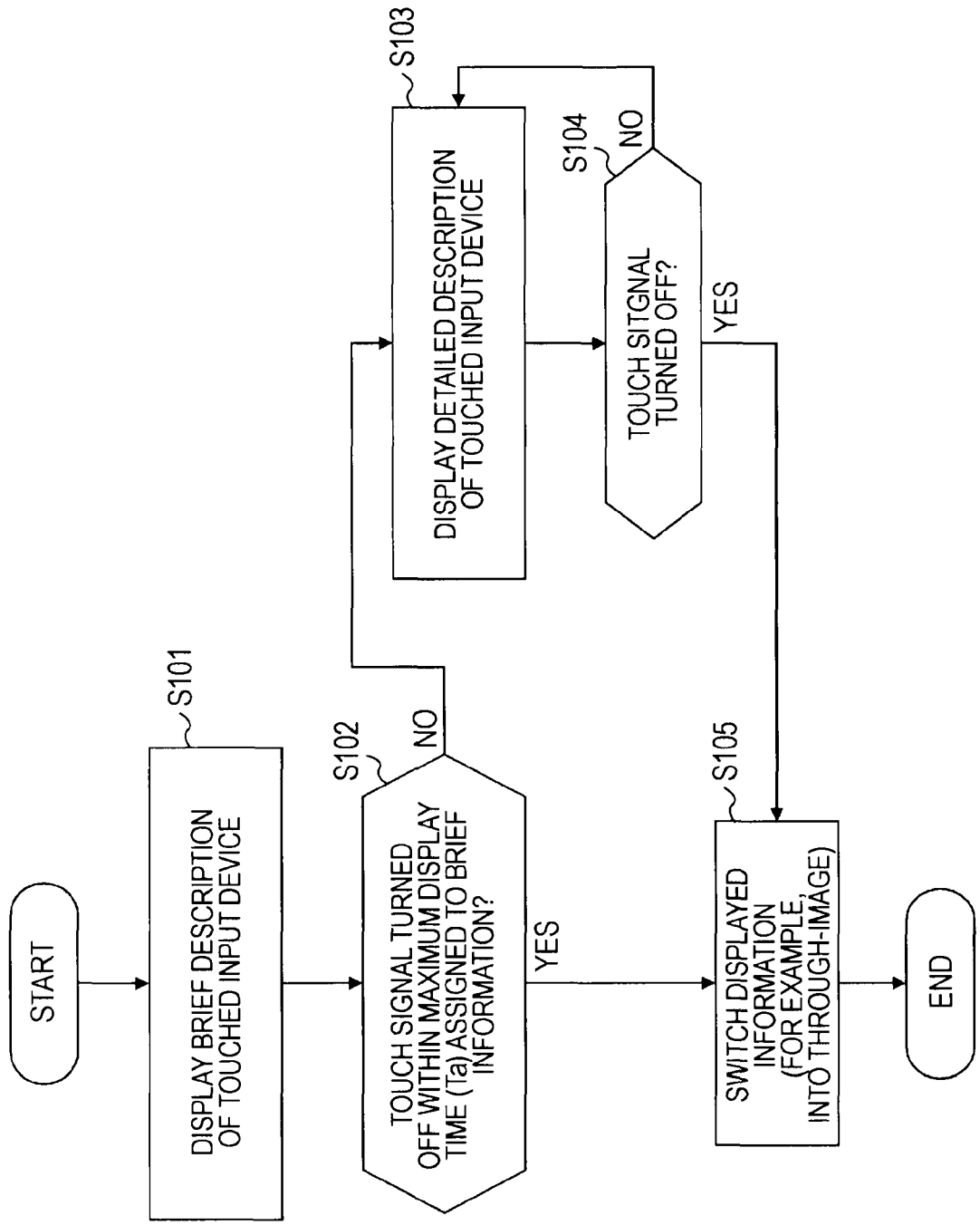
FIG. 7 is a flow chart illustrating an example of a process of switching information displayed on a display of an information display apparatus according to an embodiment of the present invention.

The process performed by the control unit of the image taking apparatus to control the displaying of information on the display according to the present embodiment is described in further detail below with reference to a flow chart shown in FIG. 7. FIG. 7 illustrates an example of a process performed by the control unit when a particular input device is touched or operated by a user.

First, in step S101, the control unit displays brief explanatory information of the input device touched or operated by the user. Next, in step S102, the control unit determines whether the user has moved his/her finger away from the input device before the expiration of the predetermined maximum display period (Ta) assigned to the brief information, by checking whether the touch information output from the touch sensor has changed into the OFF level indicating that the input device is no longer in the touched state. If the determination result is Yes, the processing flow proceeds to step S105. In step S105, the control unit switches the information displayed on the display from the brief explanatory information into, for example, a through-image.

On the other hand, in a case where the result of the determination made in step S102 is that the user did not move his/her finger away from the input device before the expiration of the predetermined maximum display period (Ta) assigned to the brief information, that is, the touch information output from the touch sensor is still maintained in the ON state, indicating that the input device is in the touched state, after the expiration of the maximum display period (Ta) assigned to the brief information, then the processing flow proceeds to step S103. In step S103, the control unit switches the information displayed on the display from the brief explanatory information to the detailed explanatory information.

Next, in step S104, it is determined whether the touch information output from the touch sensor has changed into the OFF level indicating that the input device is not in the touched state. If not, the detailed explanatory information displayed in step S103 is maintained. However, if the answer to step S104 is Yes, the processing flow proceeds to step S105, and the control unit switches the information displayed on the display from the brief explanatory information into, for example, the through-image.

In the embodiment described above, it is assumed that the control unit switches the displayed information between two pieces of information, i.e., brief information and detailed information. Alternatively, a greater number of pieces of information may be prepared, and the displayed information may be switched from one piece of information to another at boundaries of time periods defined, for example, as follows:

Period from T0 to T1: brief explanatory information
Period from T1 to T2: first-level detailed explanatory information Period from T2 to T3: second-level detailed explanatory information, and so on.

In the embodiment described above, by way of example, it is assumed that the displayed information is controlled depending on the status of the mode selection dial in terms of a contact with a user's finger. However, the input device is not limited to the mode selection dial, but displayed information may be controlled depending on the status of other input devices, as described below with reference to FIGS. 8A to 8C and other figures.

FIGS. 8A to 8C illustrate an example of a manner in which information displayed on the display is controlled depending on the status of the zoom button 104. In FIG. 8A, brief information is displayed on the display 106 when a user touches the zoom button 104 with a user's finger 301 at a time T0 and the brief information is continuously displayed for a following period in which the zoom button 104 is maintained in the touched state, unless the period does not exceed a maximum display period Ta assigned to the brief information. More specifically, over this period, the control unit 201 displays brief explanatory information 341 on the display 106 as first-level explanatory information of the input device 202 touched by the user, i.e., the zoom button 104 in this specific case. In the example shown in FIG. 8A, only a name "ZOOM BUTTON" of the touched input device is displayed as the brief explanatory information 341. If the control unit 201 detects a change in the detection information supplied from the touch sensor into the ON level when the finger of the user is brought into contact with the zoom button 104, the control unit 201 displays the brief explanatory information 341 about the zoom button 104 as shown in FIG. 8A for a following period during which the detection information output from the touch sensor is at the ON level, unless the period does not exceed the maximum display period (Ta) assigned to the brief information.

FIG. 8B illustrates an example of information displayed on the display 106 in a period after the expiration of the maximum display period (Ta) assigned to the brief information when the finger 301 of the user is still maintained in contact with the zoom button 104 after the expiration of the maximum display period (Ta). More specifically, in this period after the expiration of the maximum display period (Ta) assigned to the brief information, the control unit 201 displays detailed explanatory information 342 on the display 106 as second-level explanatory information of the zoom button 104 being in the touched state. In the example shown in FIG. 8B, a description of functions of the zoom button 104 and information indicating a zoom parameter currently set are displayed as detailed explanatory information 342 of the zoom button 104. That is, when a predetermined period (the maximum display period Ta assigned to the brief information) has elapsed since the finger of the user was put on the zoom button 104 and thus the detection information output from the touch sensor turned on, if the user's finger is still in contact with the zoom button 104, then the control unit 201 switches the displayed information from the brief explanatory information 341 to the detailed explanatory information 342.

FIG. 8C illustrates an example of information which is displayed when the finger 301 of the user is moved away from the zoom button 104 and thus the zoom button 104 returns into the non-touched state. More specifically, if the control unit 201 detects that the user has moved his/her finger away from the zoom button 104 and thus the detection information output from the touch sensor has changed into the OFF state, the control unit 201 changes the information displayed on the display 106, for example, into a through-image 343 as shown in FIG. 8C.

FIGS. 9A to 9C illustrate an example of a manner in which information displayed on the display is controlled depending on the status of the shutter button 102. FIG. 9A illustrates an example of brief information which is displayed on the display 106 when a user touches the shutter button 102 with a user's finger 301 at a time T0 and is continuously displayed for a following period in which the shutter button 102 is maintained in the touched state, unless the period does not exceed a maximum display period Ta assigned to the brief information. More specifically, over this period, the control unit 201 displays brief explanatory information 351 on the display 106 as first-level explanatory information of the input device 202 touched by the user, i.e., the shutter button 102 in this specific case. In the example shown in FIG. 9A, only a name "SHUTTER" of the touched input device and a brief description of the function thereof are displayed as the brief explanatory information 341. If the control unit 201 detects a change in the detection information supplied from the touch sensor into the ON level when the finger of the user is brought into contact with the shutter button 102, the control unit 201 displays the brief explanatory information 351 of the shutter button 102 as shown in FIG. 9A and maintains it over a following period during which the detection information output from the touch sensor is at the ON level, unless the period does not exceed the maximum display period (Ta) assigned to thee brief information.

FIG. 9B illustrates an example of information which is displayed on the display 106 in a period after the expiration of the maximum display period (Ta) assigned to the brief information when the finger 301 of the user is still maintained in contact with the shutter button 102 after the expiration of the maximum display period (Ta). More specifically, in this period after the expiration of the maximum display period (Ta) assigned to the brief information, the control unit 201 displays detailed explanatory information 352 on the display 106 as second-level explanatory information of the shutter button 102 being in the touched state. In the example shown in FIG. 9B, detailed explanatory information of the shutter button 102, including a description of the functions of the shutter button 102, is displayed as the detailed explanatory information 352. That is, when a predetermined period (the maximum display period Ta assigned to the brief information) has elapsed since the finger of the user was put on the shutter button 102 and thus the detection information output from the touch sensor turned on, if the user's finger is still in contact with the shutter button 102, then the control unit 201 switches the displayed information from the brief explanatory information 351 to the detailed explanatory information 352.

FIG. 9C illustrates an example of information which is displayed when the finger 301 of the user is moved away from the shutter button 102 and thus the shutter button 102 returns into the non-touched state. If the control unit 201 detects a change in the detection information supplied from the touch sensor into the OFF level when the finger of the user is moved away from the shutter button 102, the control unit 201 changes the information displayed on the display 106, for example, into a through-image 353 as shown in FIG. 9C.

FIGS. 10A to 10C and FIGS. 11A to 11C illustrate an example of a manner in which information displayed on the display 106 is controlled in response to an operation performed on the operation button 401 whose function is changed depending on the mode. FIGS. 10A to 10C illustrate an example of a manner in which information displayed on the display 106 is controlled for a case in which the mode selection dial 103 is set in the a shoot mode, while FIGS. 11A to 11C illustrate an example of a manner in which information displayed on the display 106 is controlled for a case in which the mode selection dial 103 is set in a playback mode.

When the mode selection dial 103 is set in the shoot mode, the operation button 401 functions as a resolution select button, while the operation button 401 functions as an image delete button when the mode selection dial 103 is set in the playback mode.

FIGS. 10A to 10C illustrate an example of a manner in which information displayed on the display 106 is controlled when the mode selection dial 103 is in the position of the shoot mode. More specifically, FIG. 10A illustrates an example of information which is displayed on the display 106 when the user's finger 301 is brought into contact with the operation button 401 and is kept displayed over a period during which the user's finger 301 is in contact in the operation button 401 unless the period does not exceed the maximum display period (Ta) assigned to the brief information. More specifically, over this period, the control unit 201 displays brief explanatory information 411 on the display 106 as first-level explanatory information of the input device 202 touched by the user, i.e., the operation button 401 in this specific case.

In this case, the displayed brief explanatory information 411 indicates the function of the operation button 401 assigned in the shoot mode selected by the mode selection dial 103. That is, as shown in FIG. 10A, the brief explanatory information 411 indicates that the operation button 401 functions as a "RESOLUTION SELECTION BUTTON" in the shoot mode currently set. That is, if the control unit 201 detects a change in the detection information supplied from the touch sensor into the ON level when the finger of the user is put on the operation button 401, then, as shown in FIG. 10A, the control unit 201 displays brief explanatory information 411 on the display 106 as brief explanatory information of the function of the operation button 401 assigned in the current operation mode (shoot mode) over a period in which the detection information output from the touch sensor is in the ON level, as long as the period is shorter than the maximum display period (Ta).

FIG. 10B illustrates an example of information which is displayed on the display 106 in a period after the expiration of the maximum display period (Ta) assigned to the brief information if the finger 301 of the user is still maintained in contact with the operation button 401 after the expiration of the maximum display period (Ta). More specifically, in this period after the expiration of the maximum display period (Ta) assigned to the brief information, the control unit 201 displays detailed explanatory information 412 on the display 106 as second-level explanatory information of the currently assigned function of the operation button 401 being in the touched state. In the example shown in FIG. 10B, detailed explanatory information of the operation button 401, including a description of the functions of the operation button 401 in the shoot mode, is displayed as the detailed explanatory information 412. That is, when a predetermined period (the maximum display period Ta assigned to the brief information) has elapsed since the finger of the user was put on the operation button 401 and thus the detection information output from the touch sensor turned on, if the user's finger is still in contact with the operation button 401, then the control unit 201 switches the displayed information from the brief explanatory information 411 to the detailed explanatory information 412. In this case, the content of the displayed information is determined depending on the current operation mode.

FIG. 10C illustrates an example of information which is displayed when the finger 301 of the user is moved away from the operation button 401 and thus the operation button 401 returns into the non-touched state. That is, if the control unit 201 detects a change in the detection information supplied from the touch sensor into the OFF level when the finger of the user is moved away from the operation button 401, the control unit 201 changes the information displayed on the display 106, for example, into a through-image 413 as shown in FIG. 10C.

FIGS. 11A to 11C illustrate an example of a manner in which information displayed on the display 106 is controlled when the mode selection dial 103 is set in the playback mode. More specifically, FIG. 11A illustrates an example of information which is displayed, in the playback mode, on the display 106 when the user's finger 301 is brought into contact with the operation button 401 and is kept displayed over a period during which the user's finger 301 is in contact in the operation button 401 unless the period does not exceed the maximum display period (Ta) assigned to the brief information. More specifically, over this period, the control unit 201 displays brief explanatory information 421 on the display 106 as first-level explanatory information of the input device 202 touched by the user, i.e., the operation button 401 in this specific case.

In this case, the displayed brief explanatory information 421 indicates the function of the operation button 401 assigned in the playback mode selected by the mode selection dial 103. That is, as shown in FIG. 11A, the brief explanatory information 421 indicates that the operation button 401 functions as a "DELETE BUTTON" in the playback mode in which the operation mode is currently set. More specifically, if the control unit 201 detects a change in the detection information supplied from the touch sensor into the ON level when the finger of the user is put on the operation button 401, then, as shown in FIG. 11A, the control unit 201 displays brief explanatory information 421 on the display 106 as brief explanatory information of the function of the operation button 401 assigned in the current operation mode (playback mode) over a period in which the detection information output from the touch sensor is in the ON level, as long as the period is shorter than the maximum display period (Ta).

FIG. 11B illustrates an example of information which is displayed on the display 106 in a period after the expiration of the maximum display period (Ta) assigned to the brief information if the finger 301 of the user is still maintained in contact with the operation button 401 after the expiration of the maximum display period (Ta). More specifically, in this period after the expiration of the maximum display period (Ta) assigned to the brief information, the control unit 201 displays detailed explanatory information 422 on the display 106 as second-level explanatory information of the currently assigned function of the operation button 401 being in the touched state. In the example shown in FIG. 11B, detailed explanatory information of the operation button 401, including a description of the function of the operation button 401 in the playback mode, is displayed as the detailed explanatory information 422. That is, when a predetermined period (the maximum display period Ta assigned to the brief information) has elapsed since the finger of the user was put on the operation button 401 and thus the detection information output from the touch sensor turned on, if the user's finger is still in contact with the operation button 401, then the control unit 201 switches the displayed information from the brief explanatory information 421 to the detailed explanatory information 422. In this case, the content of the displayed information is determined depending on the current operation mode.

FIG. 11C illustrates an example of information which is displayed when the finger 301 of the user is moved away from the operation button 401 and thus the operation button 401 returns into the non-touched state. That is, if the control unit 201 detects a change in the detection information supplied from the touch sensor into the OFF level when the finger of the user is moved away from the operation button 401, the control unit 201 changes the information displayed on the display 106, for example, into a through-image 423 as shown in FIG. 11C.

FIGS. 12A to 12C illustrates an example of a manner in which information displayed on the display 106 is controlled in response to an operation performed on the function button 441 which can be set so as to have a function specified by a user. More specifically, FIG. 12A illustrates an example of information which is displayed on the display 106 when the user's finger 301 is brought into contact with the function button 441 and is kept displayed over a period during which the user's finger 301 is in contact in the function button 441 unless the period does not exceed the maximum display period (Ta) assigned to the brief information. That is, over this period, the control unit 201 displays brief explanatory information 451 on the display 106 as first-level explanatory information of the input device 202 touched by the user, i.e., the function button 441 in this specific case.

More specifically, in this case, the displayed brief explanatory information 451 indicates the function currently assigned to the function button 441. That is, as shown in FIG. 12A, the brief explanatory information 451 indicates that a function of "TIMER-CONTROLLER SHOOTING" is currently assigned to the function button 441. More specifically, if the control unit 201 detects a change in the detection information supplied from the touch sensor into the ON level when the finger of the user is put on the function button 441, then, as shown in FIG. 12A, the control unit 201 displays brief explanatory information 451 on the display 106 as brief explanatory information of the function currently assigned to function button 441 over a period in which the detection information output from the touch sensor is in the ON level, as long as the period is shorter than the maximum display period (Ta).

FIG. 12B illustrates an example of information which is displayed on the display 106 in a period after the expiration of the maximum display period (Ta) assigned to the brief information if the finger 301 of the user is still maintained in contact with the function button 441 after the expiration of the maximum display period (Ta). More specifically, in this period after the expiration of the maximum display period (Ta) assigned to the brief information, the control unit 201 displays detailed explanatory information 452 on the display 106 as second-level explanatory information of the function of the function button 441 being in the touched state. In the example shown in FIG. 12B, detailed explanatory information of the function button 441, including a description of the function currently assigned to the function button 441, is displayed as the detailed explanatory information 452. That is, when a predetermined period (the maximum display period Ta assigned to the brief information) has elapsed since the finger of the user was put on the function button 441 and thus the detection information output from the touch sensor turned on, if the user's finger is still in contact with the function button 441, then the control unit 201 switches the displayed information from the brief explanatory information 451 to the detailed explanatory information 452. In this case, the content of the displayed information is determined depending on the function currently assigned.

FIG. 12C illustrates an example of information which is displayed when the finger 301 of the user is moved away from the function button 441 and thus the function button 441 returns into the non-touched state. More specifically, if the control unit 201 detects a change in the detection information supplied from the touch sensor into the OFF level when the finger of the user is moved away from the function button 441, the control unit 201 changes the information displayed on the display 106, for example, into a through-image 453 as shown in FIG. 12C.

Figure 13A:
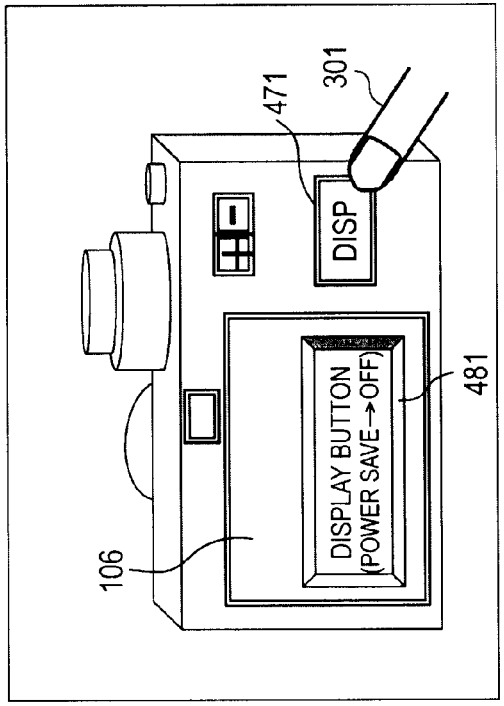
FIGS. 13A to 13C are diagrams illustrating an example of a manner in which information displayed on a display of an information display apparatus is switched according to an embodiment of the present invention.
Figure 13B:
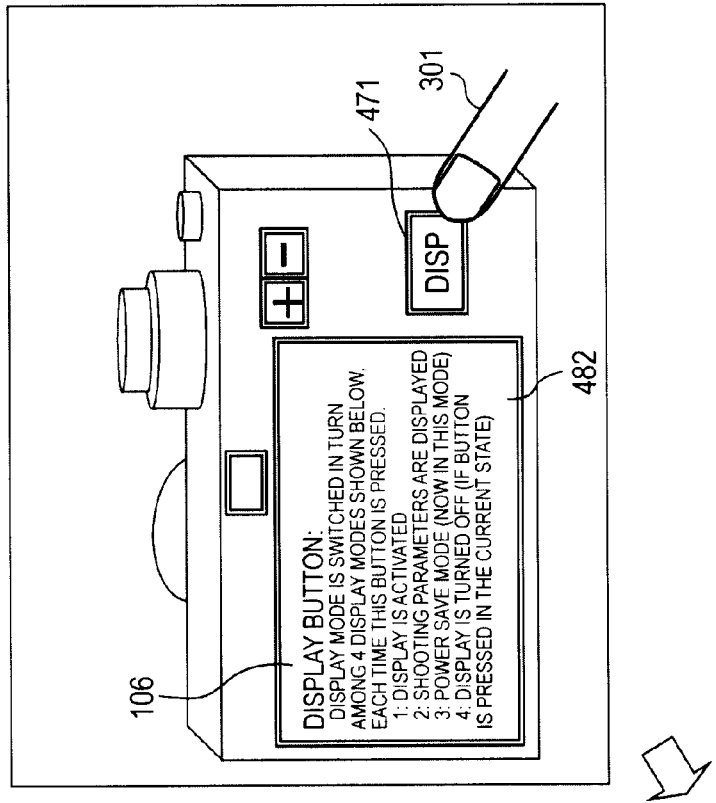
Figure 13C:
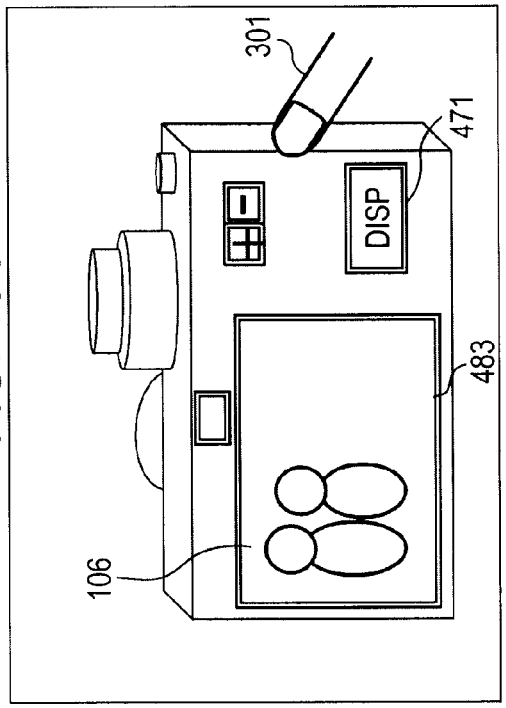

FIGS. 13A to 13C illustrate an example of a manner in which information displayed on the display 106 is controlled in response to an operation performed on the multi-function operation button 471 whose function is changed depending on the number of times the multi-function operation button 471 is operated. More specifically, FIG. 13 illustrates an example of information which is displayed on the display 106 when the user's finger 301 is brought into contact with the multi-function operation button 471 and is kept displayed over a period during which the user's finger 301 is in contact in the multi-function operation button 471 unless the period does not exceed the maximum display period (Ta) assigned to the brief information. More specifically, over this period, the control unit 201 displays brief explanatory information 481 on the display 106 as first-level explanatory information of the input device 202 touched by the user, i.e., the multi-function operation button 471 in this specific case.

In this case, the displayed brief explanatory information 481 indicates the function currently assignable to the multi-function operation button 471. That is, as shown in FIG. 13A, the brief explanatory information 481 indicates that if the multi-function operation button 471 is pressed, a process "POWER SAVE→OFF" is executed. More specifically, if the control unit 201 detects a change in the detection information supplied from the touch sensor into the ON level when the finger of the user is put on the multi-function operation button 471, then, as shown in FIG. 13A, the control unit 201 displays brief explanatory information 481 on the display 106 as brief explanatory information of the function currently assigned to the multi-function operation button 471 over a period in which the detection information output from the touch sensor is in the ON level, as long as the period is shorter than the maximum display period (Ta).

FIG. 13B illustrates an example of information displayed on the display 106 in a period after the expiration of the maximum display period (Ta) assigned to the brief information when the finger 301 of the user is still maintained in contact with the multi-function operation button 471 after the expiration of the maximum display period (Ta). More specifically, in this period after the expiration of the maximum display period (Ta) assigned to the brief information, the control unit 201 displays detailed explanatory information 482 on the display 106 as second-level explanatory information of the multi-function operation button 471 being in the touched state. In the example shown in FIG. 13B, detailed explanatory information of the multi-function operation button 471, including a description of all functions assignable to the multi-function operation button 471, is displayed as the detailed explanatory information 482. That is, when a predetermined period (the maximum display period Ta assigned to the brief information) has elapsed since the finger of the user was put on the multi-function operation button 471 and thus the detection information output from the touch sensor turned on, if the user's finger is still in contact with the multi-function operation button 471, then the control unit 201 switches the displayed information from the brief explanatory information 481 to the detailed explanatory information 482.

FIG. 13C illustrates an example of information which is displayed when the finger 301 of the user is moved away from the multi-function operation button 471 and thus the multi-function operation button 471 returns into the non-touched state. More specifically, if the control unit 201 detects a change in the detection information supplied from the touch sensor into the OFF level when the finger of the user is moved away from the multi-function operation button 471, the control unit 201 changes the information displayed on the display 106, for example, into a through-image 483 as shown in FIG. 13C.

FIGS. 14A to 14C illustrate an example of a manner in which information displayed on the display 106 is controlled in response to an operation performed on the multi-function operation button 501 whose function is assigned depending on a manner in which the multi-function operation button 501 is operated. More specifically, FIG. 14A illustrates an example of information which is displayed on the display 106 when the user's finger 301 is brought into contact with the multi-function operation button 501 and is kept displayed over a period during which the user's finger 301 is in contact in the multi-function operation button 501 unless the period does not exceed the maximum display period (Ta) assigned to the brief information. More specifically, over this period, the control unit 201 displays brief explanatory information 521 on the display 106 as first-level explanatory information of the input device 202 touched by the user, i.e., the multi-function operation button 501 in this specific case.

In this case, the displayed brief explanatory information 521 indicates functions assignable to the multi-function operation button 501 depending on the manner in which the multi-function operation button 501 is operated. More specifically, if the control unit 201 detects a change in the detection information supplied from the touch sensor into the ON level when the finger of the user is put on the multi-function operation button 501, then, as shown in FIG. 14A, the control unit 201 displays brief explanatory information 521 on the display 106 as brief explanatory information of functions assignable to the multi-function operation button 501 over a period in which the detection information output from the touch sensor is in the ON level, as long as the period is shorter than the maximum display period (Ta).

FIG. 14B illustrates an example of information displayed on the display 106 in a period after the expiration of the maximum display period (Ta) assigned to the brief information when the finger 301 of the user is still maintained in contact with the multi-function operation button 501 after the expiration of the maximum display period (Ta). More specifically, in this period after the expiration of the maximum display period (Ta) assigned to the brief information, the control unit 201 displays detailed explanatory information 522 on the display 106 as second-level explanatory information of the multi-function operation button 501 being in the touched state. In the example shown in FIG. 14B, detailed explanatory information of the multi-function operation button 501, including a description of all functions assignable to the multi-function operation button 501, is displayed as the detailed explanatory information 522. That is, when a predetermined period (the maximum display period Ta assigned to the brief information) has elapsed since the finger of the user was put on the multi-function operation button 501 and thus the detection information output from the touch sensor turned on, if the user's finger is still in contact with the multi-function operation button 501, then the control unit 201 switches the displayed information from the brief explanatory information 521 to the detailed explanatory information 522.

FIG. 14C illustrates an example of information which is displayed when the finger 301 of the user is moved away from the multi-function operation button 501 and thus the multi-function operation button 501 returns into the non-touched state. More specifically, if the control unit 201 detects a change in the detection information supplied from the touch sensor into the OFF level when the finger of the user is moved away from the multi-function operation button 501, the control unit 201 changes the information displayed on the display 106, for example, into a through-image 523 as shown in FIG. 14C.

In the present embodiment, as described above, the displayed information is switched in accordance with the touch information indicating the contact status of each input device. If a user's finger is kept in contact with a particular input device, the information is switched to more detailed information depending on a period during which the input device is kept in the touched state thereby to provide information to a user depending on whether the user needs the detailed information.

In the embodiments described above, by way of example, it is assumed that information is switched between brief information and detailed information. However, information is not limited to brief information and detailed information, but information may be switched among a plurality of different pieces of information (first information to n-th information).

The present invention has been described above with reference to specific embodiments by way of example and not limitation. It should be apparent to those skilled in the art that various modifications and substitutions are possible without departing from the spirit and the scope of the invention. That is, the embodiments have been described above by way of example and not limitation. The scope of the invention is to be determined solely by the claims.

Any of the processes disclosed in the present description may be performed by hardware, software, or a combination of hardware and software. In the case in which a process is performed by software, a program of the process may be installed into a memory disposed in a dedicated computer embedded in hardware and the program may be executed by the computer, or the program may be installed on a general-purpose computer capable of executing various processes and may be executed on the general-purpose computer. The program may be preinstalled in a storage medium. Instead of installing the program into the computer via a storage medium, the program may be received via a network such as a LAN (Local Area Network) or the Internet, and the received program may be installed in an internal storage medium such as a hard disk drive disposed in the computer.

The processes disclosed in the present description may be performed time-sequentially in the same order as that described in the program, or may be performed in parallel or individually depending on the processing power of the computer. In the present description, the term "system" is used to describe a logical collection of a plurality of devices, and it is not necessarily required that the plurality of devices be disposed in a single case.

It should be noted again that it should be understood by those skilled in the art that various modifications, combinations, sub-combinations and alterations may occur depending on design requirements and other factors insofar as they are within the scope of the appended claims or the equivalents thereof.

What is claimed is:

1. An information display apparatus comprising:
an input device configured to input user operation information;
a touch sensor configured to detect the state of the input device in terms of whether the input device is touched by a user;
a display configured to display information; and
a control unit configured to receive user operation information from the input device and sensor detection information from the touch sensor, and control displaying of the information on the display in accordance with the received user operation information and the sensor detection information,
the control unit controlling the displaying of the information such that
if the touch information indicating that the input device is touched by the user is received from the touch sensor, the control unit displays first information that includes a name associated with the input device on the display,
and if the input device is then maintained in the touched state over a period equal to or greater than a predetermined maximum display period assigned to the first information, the control unit switches the information displayed on the display into information including at least second information that includes at least operation information, function information, or setting information associated with the input device.

2. The information display apparatus according to claim 1, wherein the control unit controls the displaying of the information such that if information indicating that the input device is not touched by the user is received from the touch sensor during the execution of displaying the first information or the second information associated with the input device, the control unit stops the displaying of the first information or the second information.

3. The information display apparatus according to claim 1, wherein
the input device is an input device whose function changes depending on a mode in which an operation mode is currently set, and
the control unit controls the displaying of information such that when the first information or the second information is displayed, the control unit displays information associated with the input device depending on the current operation mode.

4. The information display apparatus according to claim 1, wherein
the input device is a function input device configured to be set so as to have a function selected by a user, and
the control unit controls the displaying of information such that when the first information or the second information is displayed, the control unit displays information associated with the function input device depending on the function currently set.

5. The information display apparatus according to claim 1, wherein
the input device is a multi-function input device whose function is assigned depending on the number of times the multi-function input device is operated or depending on a manner in which the multi-function input device is operated, and
the control unit controls the displaying of information such that when the first information or the second information is displayed, the control unit displays information associated with the currently assigned function of the multi-function input device.

6. An image taking apparatus comprising:
imaging means for producing an image of a subject;
an input device configured to input user operation information;
a touch sensor configured to detect the state of the input device in terms of whether the input device is touched by a user;
a display configured to display information; and
a control unit configured to receive user operation information from the input device and sensor detection information from the touch sensor, and control displaying of the information on the display in accordance with the received user operation information and the sensor detection information,
the control unit controlling the displaying of the information such that
if the touch information indicating that the input device is touched by the user is received from the touch sensor, the control unit displays first information that includes a name associated with the input unit on the display,
and if the input device is then maintained in the touched state over a period equal to or greater than a predetermined maximum display period assigned to the first information, the control unit switches the information displayed on the display into information including at least second information that includes at least operation information, function information, or setting information associated with the input device.

7. The image taking apparatus according to claim 6, wherein
the control unit controls the displaying of information such that if information indicating that the input device is not touched by the user is received from the touch sensor during the execution of displaying the first information or the second information associated with the input device, the control unit stops the displaying of the first information or the second information.

8. A method of controlling displaying information, executed in an information display apparatus, comprising the steps of:
by a control unit, inputting sensor detection information from a touch sensor associated with an input device; and
by the control unit, controlling displaying the information such that if the control unit receives touch information indicating that the input device is touched by a user from the touch sensor, the control unit displays first information that includes a name associated with the input unit on a display, and if the control unit determines that the input device is then maintained in the touched state over a period equal to or greater than a predetermined maximum display period assigned to the first information, the control unit switches the information displayed on the display into information including at least second information that includes at least operation information, function information, or setting information associated with the input device.

9. The method of controlling displaying information according to claim 8, wherein the step of controlling displaying the information further includes the step of stopping the displaying of the first information or the second information if information indicating that the input device is not touched by the user is received from the touch sensor during the execution of displaying the first information or the second information associated with the input device.

10. A non-transitory computer readable storage medium encoded with computer program instructions, which when executed by a computer cause the computer to implement a process of controlling displaying information in an information display apparatus, the method comprising:
controlling a control unit to input sensor detection information from a touch sensor associated with an input device; and
controlling the control unit to control displaying the information such that if the control unit receives touch information indicating that the input device is touched by a user from the touch sensor, the control unit displays first information that includes a name associated with the input unit on a display, and if the control unit determines that the input device is then maintained in the touched state over a period equal to or greater than a predetermined maximum display period assigned to the first information, the control unit switches the information displayed on the display into information including at least second information that includes at least operation information, function information, or setting information associated with the input device.

11. An image taking apparatus comprising:
an imaging unit configured to produce an image of a subject;
an input device configured to input user operation information;
a touch sensor configured to detect the state of the input device in terms of whether the input device is touched by a user;
a display configured to display information; and
a control unit configured to receive user operation information from the input device and sensor detection information from the touch sensor, and control displaying of the information on the display in accordance with the received user operation information and the sensor detection information,
the control unit controlling the displaying of the information such that
if the touch information indicating that the input device is touched by the user is received from the touch sensor, the control unit displays first information that includes a name associated with the input device on the display,
and if the input device is then maintained in the touched state over a period equal to or greater than a predetermined maximum display period assigned to the first information, the control unit switches the information displayed on the display into information including at least second information that includes at least operation information, function information, or setting information associated with the input device.

* * * * *